United States Patent
Seo et al.

(10) Patent No.: US 12,289,680 B2
(45) Date of Patent: Apr. 29, 2025

(54) DISCONTINUOUS RECEPTION OPERATION IN WIRELESS COMMUNICATION SYSTEM

(71) Applicant: LG Electronics Inc., Seoul (KR)

(72) Inventors: Inkwon Seo, Seoul (KR); Joonkui Ahn, Seoul (KR); Changhwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 391 days.

(21) Appl. No.: 17/635,659

(22) PCT Filed: Aug. 14, 2020

(86) PCT No.: PCT/KR2020/010840
§ 371 (c)(1),
(2) Date: Feb. 15, 2022

(87) PCT Pub. No.: WO2021/029729
PCT Pub. Date: Feb. 18, 2021

(65) Prior Publication Data
US 2022/0295405 A1 Sep. 15, 2022

Related U.S. Application Data

(60) Provisional application No. 62/887,652, filed on Aug. 15, 2019.

(51) Int. Cl.
*H04W 52/02* (2009.01)
(52) U.S. Cl.
CPC .............................. *H04W 52/0235* (2013.01)
(58) Field of Classification Search
None
See application file for complete search history.

(56) References Cited

U.S. PATENT DOCUMENTS

| | | | |
|---|---|---|---|
| 2018/0279344 A1* | 9/2018 | Bagheri | H04W 72/23 |
| 2020/0245395 A1* | 7/2020 | Zhang | H04L 5/0053 |
| 2020/0323026 A1* | 10/2020 | Kim | H04W 52/0216 |

FOREIGN PATENT DOCUMENTS

| | | |
|---|---|---|
| WO | WO2018204799 | 11/2018 |
| WO | WO2019059674 | 3/2019 |

OTHER PUBLICATIONS

Ericsson, "Design of PDCCH-based power saving signal/channel," R1-1907322, 3GPP TSG-RAN WG1 Meeting #97, Reno, USA, dated May 13-17, 2019, 12 pages.

(Continued)

*Primary Examiner* — Alex Skripnikov
(74) *Attorney, Agent, or Firm* — Fish & Richardson P.C.

(57) ABSTRACT

Provided are a discontinuous reception (DRX) operation method of a terminal in a wireless communication system and an apparatus applying the method. The method comprises the steps of: receiving, from a base station, first configuration information which indicates a monitoring occasion for detecting first DCI comprising information that indicates whether the terminal has woken up; receiving, from the base station, second configuration information which indicates an operation to be applied to the terminal when the first DCI is not detected; monitoring a first PDCCH in order to detect the first DCI in the monitoring occasion; and when the first DCI fails to be detected in the monitoring occasion, monitoring a second PDCCH for detecting not the first DCI but second DCI in a next DRX-on duration on the basis of the second configuration information.

7 Claims, 31 Drawing Sheets

(56) References Cited

OTHER PUBLICATIONS

Huawei, HiSilicon, "PDCCH-based power saving signal/channel," R1-1906005, 3GPP TSG RAN WG1 Meeting #97, Reno, USA, dated May 13-17, 2019, 12 pages.
Samsung, "PDCCH-based power saving signal/channel," R1-1906980, 3GPP TSG RAN WG1 #97, Reno, USA, dated May 13-17, 2019, 14 pages.

* cited by examiner

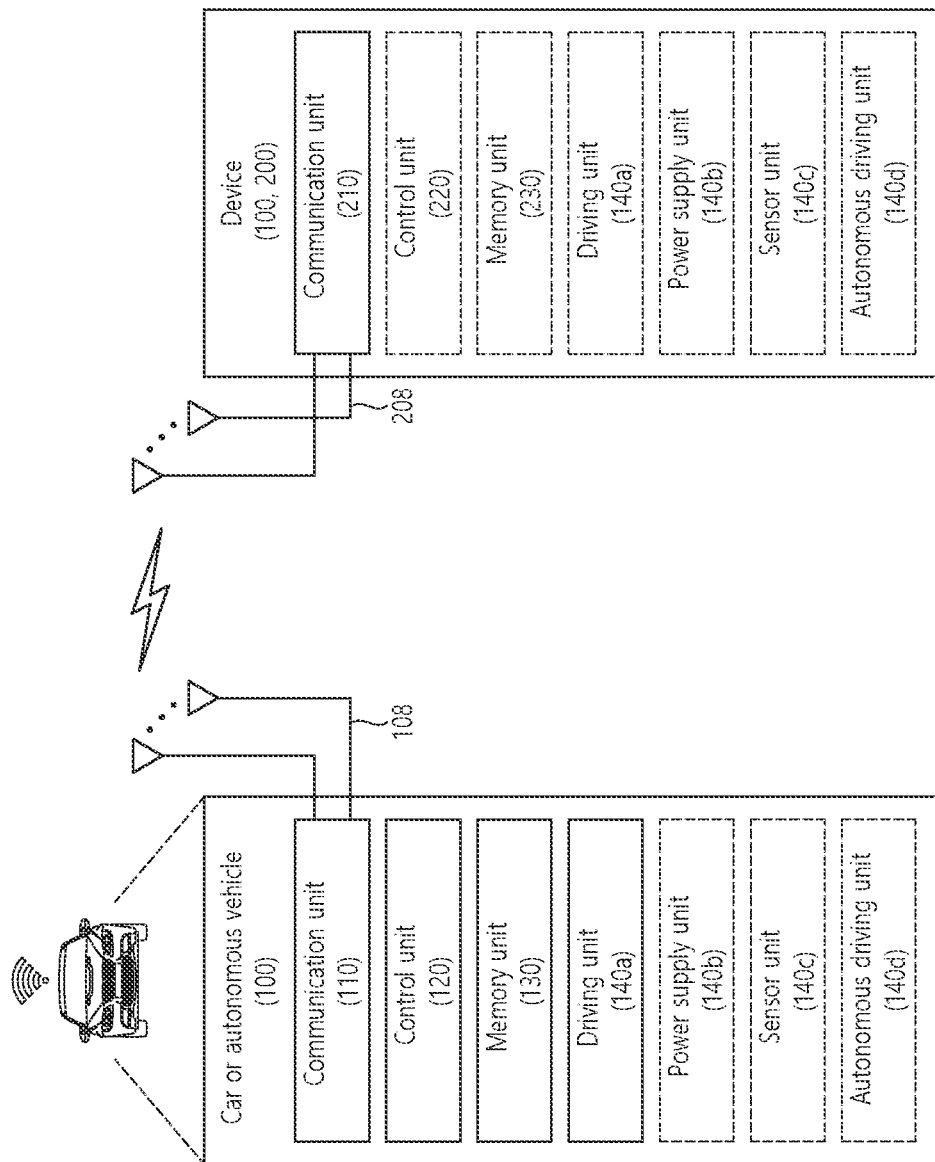

DISCONTINUOUS RECEPTION OPERATION IN WIRELESS COMMUNICATION SYSTEM

CROSS-REFERENCE TO RELATED APPLICATIONS

This application is a National Stage application under 35 U.S.C. § 371 of International Application No. PCT/KR2020/010840, filed on Aug. 14, 2020, which claims the benefit of U.S. Provisional Application No. 62/887,652, filed on Aug. 15, 2019. The disclosures of the prior applications are incorporated by reference in their entirety.

FIELD OF THE DESCRIPTION

The present disclosure relates to a discontinuous reception operation of a terminal in a wireless communication system.

RELATED ART

As a growing number of communication devices require higher communication capacity, there is a need for advanced mobile broadband communication as compared to existing radio access technology (RAT). Massive machine-type communication (MTC), which provides a variety of services anytime and anywhere by connecting a plurality of devices and a plurality of objects, is also one major issue to be considered in next-generation communication. In addition, designs for communication systems considering services or a user equipment (UE) sensitive to reliability and latency are under discussion. Introduction of next-generation RAT considering enhanced mobile broadband communication, massive MTC, and ultra-reliable and low-latency communication (URLLC) is under discussion. In this disclosure, for convenience of description, this technology may be referred to as new RAT or new radio (NR). NR is also referred to as a fifth generation (5G) system.

As the performance and functions of the UE such as display resolution, display size, processor, memory, and application increase of the UE improve, power consumption also increases. Since the power supply of the UE may be limited to the battery, it is important to reduce power consumption. This is the same for a UE operating in NR.

As one example for reducing power consumption of the UE, there is a discontinuous reception (DRX) operation. The UE may have to monitor the physical downlink control channel (PDCCH) in every subframe to know whether there is data to be received. However, since the UE does not always receive data in all subframes, this operation causes unnecessary battery consumption. DRX is an operation to reduce such battery consumption. That is, the UE wakes up in a DRX cycle period and monitors a control channel (e.g., PDCCH) for a predetermined time (DRX on duration). If there is no PDCCH detection during the time, the UE enters a sleeping mode, that is, a state in which a radio frequency (RF) transceiver is turned off. If the PDCCH is detected during the time (DRX on duration), the PDCCH monitoring time may be extended and data transmission/reception according to the detected PDCCH may be performed.

Meanwhile, an additional power consumption reduction method may be introduced for such a DRX operation. For example, it may be unnecessary or inefficient for the UE to wake up every DRX cycle to monitor the PDCCH. To this end, the network may provide a signal (let's call it a wake-up signal: WUS) including information related to whether to wake up to the UE before the start of the DRX cycle, and the UE may monitor the WUS at WUS monitoring occasions within the configured WUS monitoring window. The UE may perform an indicated operation in the DRX cycle based on the detected WUS.

However, in some cases, in a situation in which the terminal is configured to monitor the WUS, the terminal may not detect the WUS in the WUS monitoring occasion. However, from the UE's point of view, it is impossible to distinguish the reason for not detecting the WUS is that whether the base station does not transmit the WUS, or whether the base station transmits the WUS but the WUS detection fails because the channel environment is not good.

For example, when the base station transmits the WUS but the terminal does not detect it, the base station may transmit the PDCCH in the next DRX on duration on the premise that the terminal has woken up, and may transmit data based on the PDCCH. However, the UE will not be able to properly receive the PDCCH and the data because it does not wake up in the next DRX on duration. Then, problems such as a decrease in throughput, an increase in delay, and a decrease in reliability occur. There is a need for a method and apparatus capable of solving these problems.

SUMMARY

A technical object of the disclosure is to provide a method for discontinuous reception operation of a terminal in a wireless communication system and an apparatus using the same.

In one aspect, provided is a method for a DRX operation of a UE in a wireless communication system. The method includes receiving, from a base station, first configuration information informing of a monitoring occasion for detecting first downlink control information (DCI) including information for whether the UE to wake-up, receiving second configuration information for an operation to be applied to the UE when the first DCI is not detected and monitoring a first physical downlink control channel (PDCCH) for detecting the first DCI in the monitoring occasion. Based on not detecting the first DCI in the monitoring occasion, the UE monitors a second PDCCH for detecting second DCI other than the first DCI in a next DRX on duration based on the second configuration information.

In another aspect, provided is a user equipment (UE). The UE includes a transceiver for transmitting and receiving a radio signal and a processor operating in connected to the transceiver. The processor is configured to: receive, from a base station, first configuration information informing of a monitoring occasion for detecting first downlink control information (DCI) including information for whether the UE to wake-up, receive second configuration information for an operation to be applied to the UE when the first DCI is not detected and monitor a first physical downlink control channel (PDCCH) for detecting the first DCI in the monitoring occasion. Based on not detecting the first DCI in the monitoring occasion, the UE monitors a second PDCCH for detecting second DCI other than the first DCI in a next discontinuous reception (DRX) on duration based on the second configuration information.

In still another aspect, provided is a method of transmitting downlink control information (DCI) by a base station. The method includes transmitting, to a user equipment (UE), first configuration information informing of a monitoring occasion for detecting first downlink control information (DCI) including information for whether the UE to wake-up, transmitting, to the UE, second configuration information for an operation to be applied to the UE when the first DCI is not detected in the monitoring occasion and transmitting second DCI other than the first DCI in a next discontinuous reception (DRX) on duration after the monitoring occasion based on the second configuration information.

In still another aspect, provided is a base station. The base station includes a transceiver for transmitting and receiving a radio signal and a processor operating in connected to the transceiver. The processor is configured to: transmit, to a user equipment (UE), first configuration information informing of a monitoring occasion for detecting first downlink control information (DCI) including information for whether the UE to wake-up, transmit, to the UE, second configuration information for an operation to be applied to the UE when the first DCI is not detected in the monitoring occasion and transmit second DCI other than the first DCI in a next discontinuous reception (DRX) on duration after the monitoring occasion based on the second configuration information.

In still another aspect, provided is at least one computer-readable medium (CRM) comprising an instruction based on being executed by at least one processor. The CRM receives, from a base station, first configuration information informing of a monitoring occasion for detecting first downlink control information (DCI) including information for whether the UE to wake-up, receives second configuration information for an operation to be applied to the UE when the first DCI is not detected and monitors a first physical downlink control channel (PDCCH) for detecting the first DCI in the monitoring occasion. Based on not detecting the first DCI in the monitoring occasion, the CRM monitors a second PDCCH for detecting second DCI other than the first DCI in a next discontinuous reception (DRX) on duration based on the second configuration information.

In still another aspect, provided is an apparatus operated in a wireless communication system. The apparatus comprising: a processor and a memory to be operatively connected to the processor. The processor is configured to: receive, from a base station, first configuration information informing of a monitoring occasion for detecting first downlink control information (DCI) including information for whether the UE to wake-up, receive second configuration information for an operation to be applied to the UE when the first DCI is not detected and monitor a first physical downlink control channel (PDCCH) for detecting the first DCI in the monitoring occasion. Based on not detecting the first DCI in the monitoring occasion, the UE monitors a second PDCCH for detecting second DCI other than the first DCI in a next discontinuous reception (DRX) on duration based on the second configuration information.

The UE may monitor the first DCI including information indicating whether the UE will wake up in the DRX on duration before the DRX on duration. However, when the first DCI is monitored but the first DCI is not detected, a misrecognition may occur between the base station and the UE as to whether the UE is awake. For example, the base station transmits the first DCI, but the channel condition is not good, so the UE may not be able to detect the first DCI. In this case, the base station expects the UE to wake up, but the UE may not wake up because the first DCI is not detected. In preparation for this case, the base station may preset an operation to be applied to the UE when the first DCI is not detected. For example, the base station may preset/instruct, through a highly reliable higher layer signal, the UE to wake up in the next DRX on duration and monitor the PDCCH if the UE fails to detect the first DCI. Then, even if the UE fails to detect the first DCI at the monitoring occasion for the first DCI, the UE may perform PDCCH monitoring for detecting the second DCI in the next DRX on duration. Through this method, ambiguity does not occur between the terminal and the network, and it is possible to prevent a decrease in throughput, increase in delay, decrease in reliability, and the like from occurring.

BRIEF DESCRIPTION OF THE DRAWINGS

FIG. 31 illustrates a vehicle or autonomous driving vehicle that may be applied herein.

DESCRIPTION OF EXEMPLARY EMBODIMENTS

Figure 1:
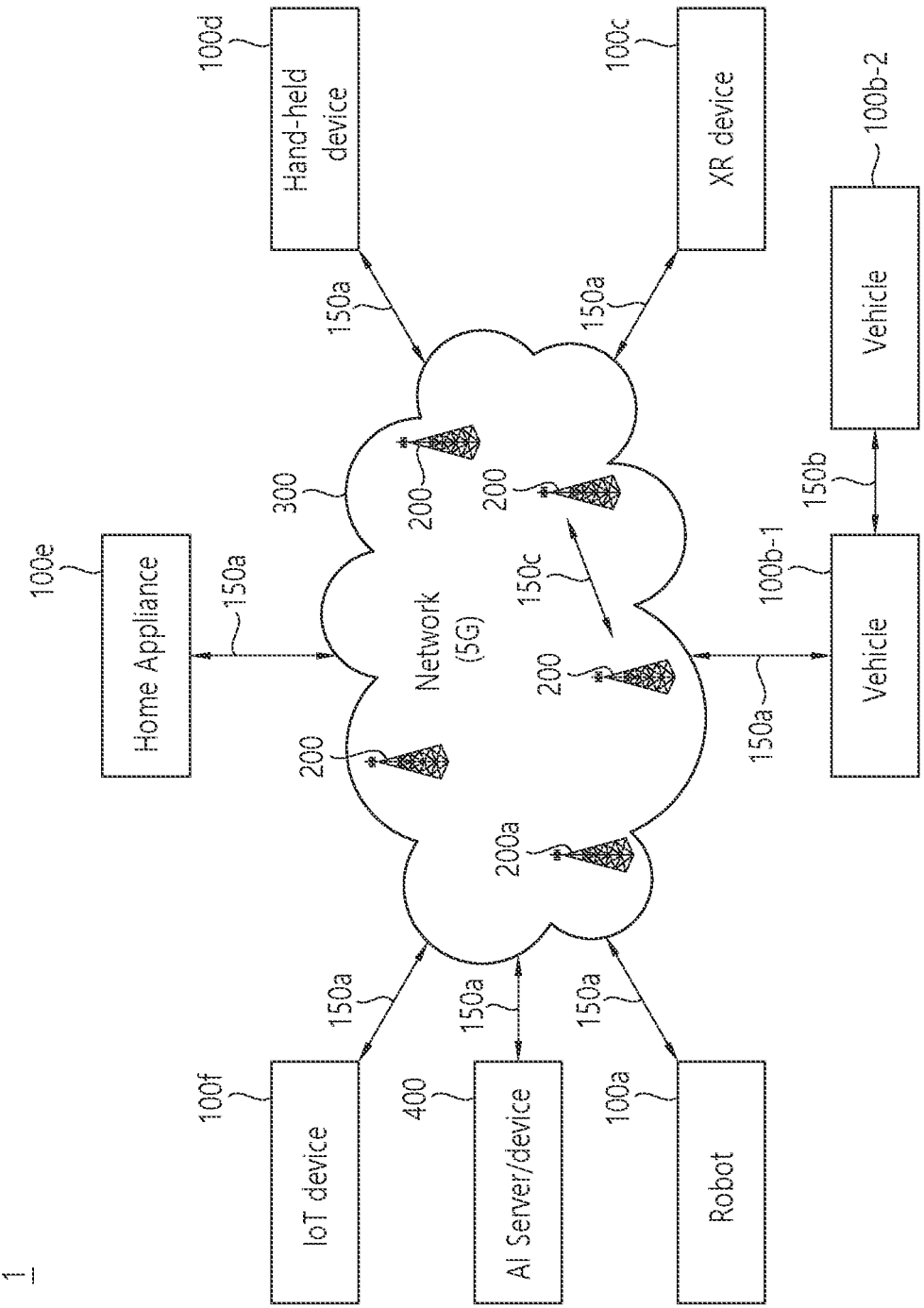
FIG. 1 illustrates the communication system 1 applied to this disclosure.

FIG. 1 illustrates a communication system 1 applied to the present disclosure.

Referring to FIG. 1, a communication system 1 applied to the present specification includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Here, the wireless communication technology implemented in the wireless devices 100 and 200 of the present specification may include a narrowband Internet of Things for low-power communication as well as LTE, NR, and 6G. At this time, for example, NB-IoT technology may be an example of LPWAN (Low Power Wide Area Network) technology, and it may be implemented in standards such as LTE Cat NB1 and/or LTE Cat NB2, and is not limited to the above-described name. Additionally or alternatively, the wireless communication technology implemented in the wireless devices 100 and 200 of the present specification may perform communication based on the LTE-M technology. In this case, as an example, the LTE-M technology may be an example of an LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 100 and 200 of the present specification may include at least one of ZigBee, Bluetooth, and Low Power Wide Area Network (LPWAN) in consideration of low power communication, and is not limited to the above-mentioned names. For example, the ZigBee technology can create PAN (personal area networks) related to small/low-power digital communication based on various standards such as IEEE 802.15.4, and can be called by various names.

Figure 2:
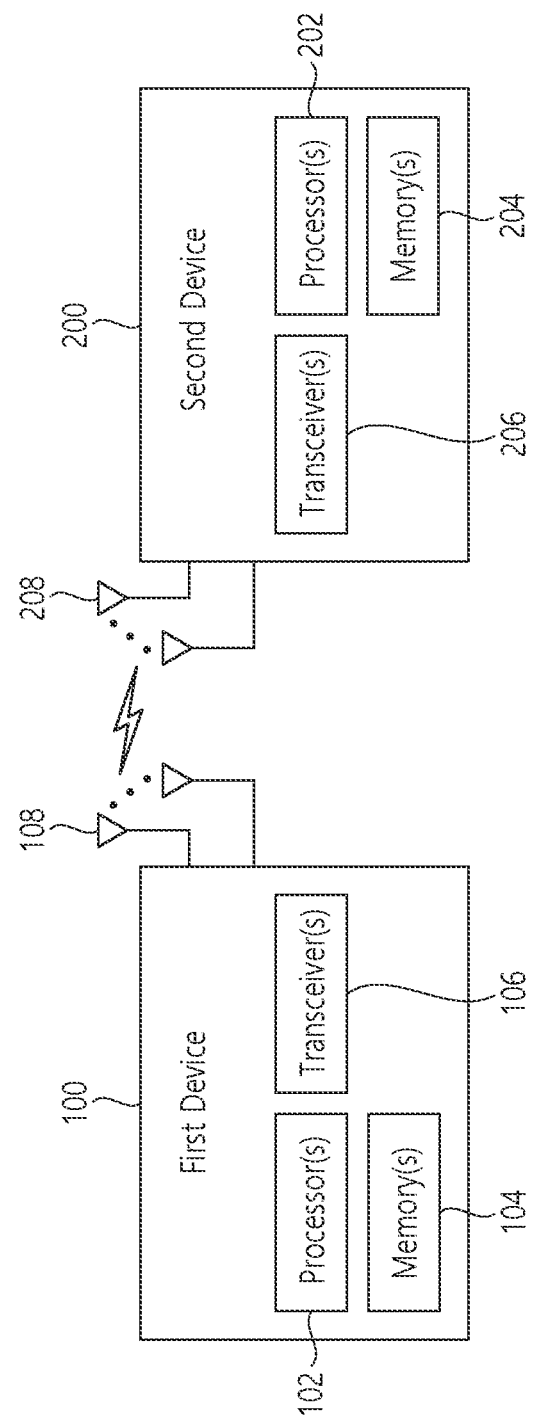
FIG. 2 illustrates a wireless device that is applicable to this specification.

FIG. 2 illustrates a wireless device applicable to this specification.

Referring to FIG. 2, the first wireless device 100 and the second wireless device 200 may transmit/receive wireless signals through various wireless access technologies (e.g., LTE, NR).

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In this specification, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In this specification, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The one or more processors 102 and 202 may be implemented as at least one computer readable medium (CRM) including instructions based on being executed by the at least one processor.

For example, each method described in below may be performed by at least one computer readable medium (CRM) including instructions based on being executed by at least one processor. The CRM may perform, for example, receiving, from a base station, first configuration information informing of a monitoring occasion for detecting first downlink control information (DCI) including information for whether the UE to wake-up, receiving second configuration information for an operation to be applied to the UE when the first DCI is not detected and monitoring a first PDCCH for detecting the first DCI in the monitoring occasion, and based on not detecting the first DCI in the monitoring occasion, the CRM monitors a second PDCCH for detecting second DCI other than the first DCI in a next discontinuous reception (DRX) on duration based on the second configuration information.

The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 3:
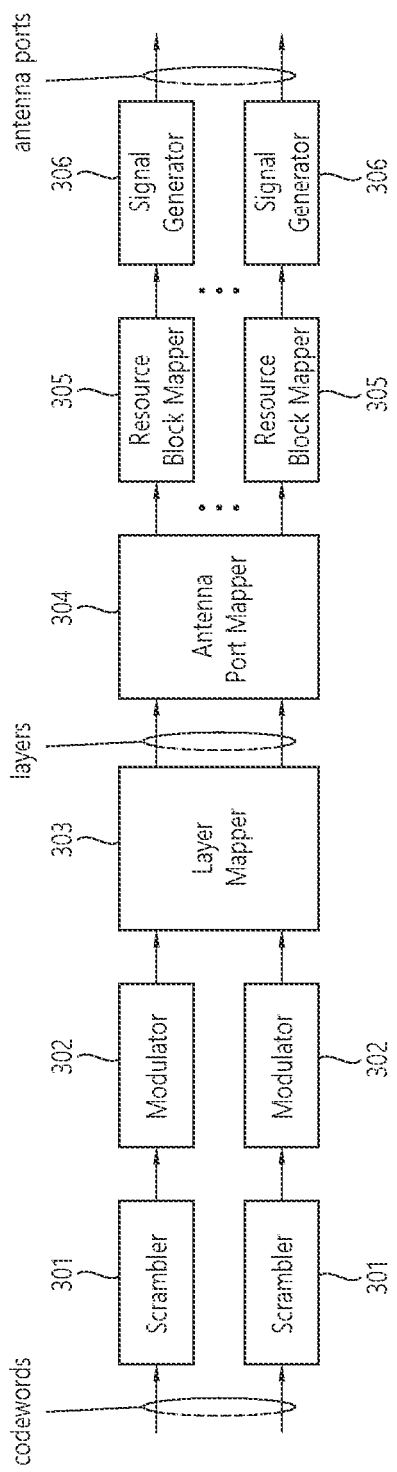
FIG. 3 illustrates a signal processing circuit for a transmission signal.

FIG. 3 shows an example of a structure of a signal processing module. Herein, signal processing may be performed in the processors 102 and 202 of FIG. 2.

Referring to FIG. 3, the transmitting device (e.g., a processor, the processor and a memory, or the processor and a transceiver) in a UE or BS may include a scrambler 301, a modulator 302, a layer mapper 303, an antenna port mapper 304, a resource block mapper 305, and a signal generator 306.

The transmitting device can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 4:
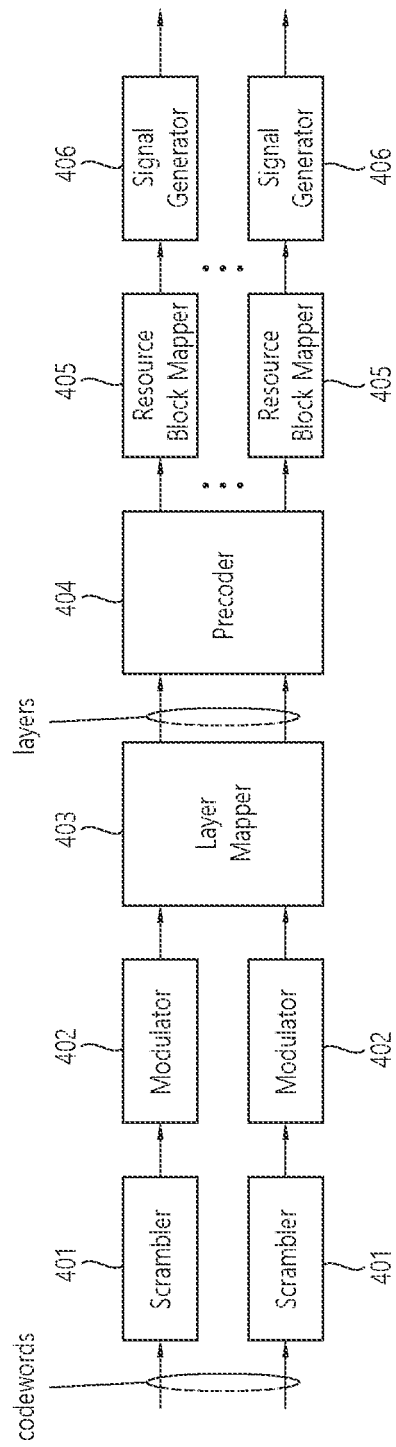
FIG. 4 shows another example of the structure of a signal processing module in a transmission device.

FIG. 4 shows another example of a structure of a signal processing module in a transmitting device. Herein, signal processing may be performed in a processor of a UE/BS, such as the processors 102 and 202 of FIG. 2.

Referring to FIG. 4, the transmitting device (e.g., a processor, the processor and a memory, or the processor and a transceiver) in the UE or the BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 5:
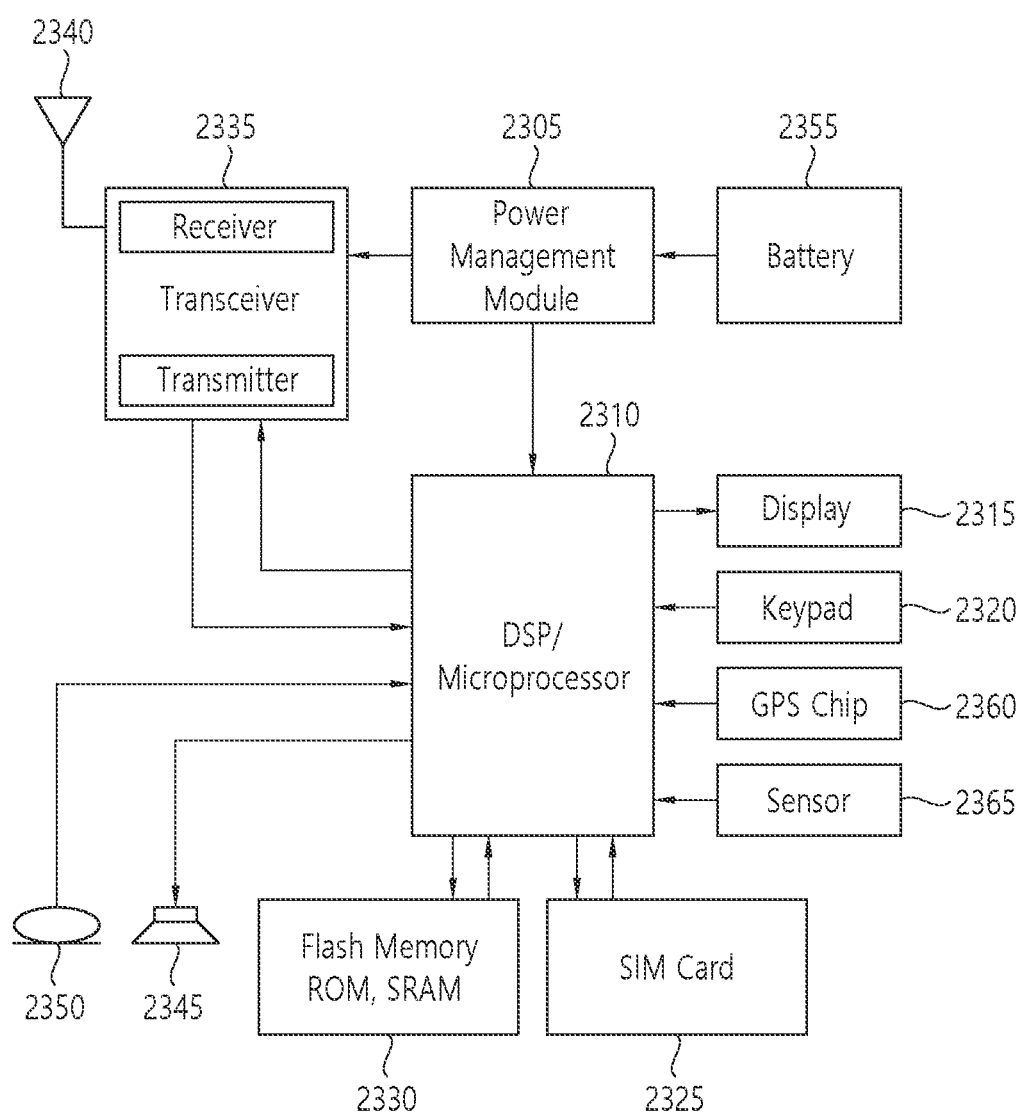
FIG. 5 illustrates an example of a wireless communication device according to an implementation of the present disclosure.

FIG. 5 illustrates an example of a wireless communication device according to an implementation example of the present disclosure.

Referring to FIG. 5, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 5 may be the processors 102 and 202 in FIG. 2.

The memory 2330 is connected to the processor 2310 and stores information related to operations of the processor. The memory may be located inside or outside the processor and connected to the processor through various techniques such as wired connection and wireless connection. The memory 2330 in FIG. 5 may be the memories 104 and 204 in FIG. 2.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 5 may be the transceivers 106 and 206 in FIG. 2.

Although not shown in FIG. 5, various components such as a camera and a universal serial bus (USB) port may be additionally included in the UE. For example, the camera may be connected to the processor 2310.

FIG. 5 is an example of implementation with respect to the UE and implementation examples of the present disclosure are not limited thereto. The UE need not essentially include all the components shown in FIG. 5. That is, some of the components, for example, the keypad 2320, the GPS chip 2360, the sensor 2365 and the SIM card 2325 may not be essential components. In this case, they may not be included in the UE.

Figure 6:
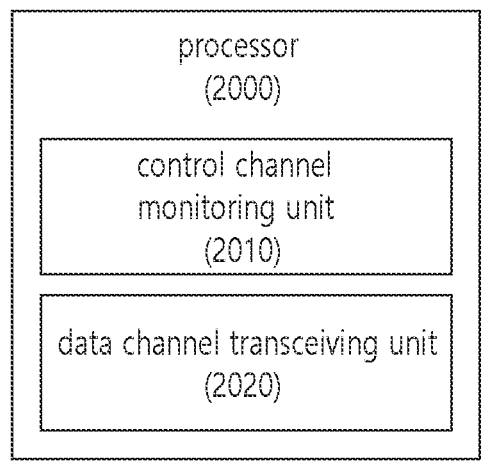
FIG. 6 shows an example of a processor 2000.

FIG. 6 shows an example of a processor 2000.

Referring to FIG. 6, the processor 2000 may include a control channel monitoring unit 2010 and a data channel receiving unit 2020. The processor 2000 may execute the methods (the position of the receiver) described in below. For example, the processor 2000 receives, from a base station, first configuration information informing of a monitoring occasion for detecting first downlink control information (DCI) including information for whether the UE to wake-up. And the processor 2000 receives second configuration information for an operation to be applied to the UE when the first DCI is not detected, and monitor a first PDCCH for detecting the first DCI in the monitoring occasion. Here, based on not detecting the first DCI in the monitoring occasion, the The processor 2000 monitors a second PDCCH for detecting second DCI other than the first DCI in a next DRX on duration based on the second configuration information. The processor 2000 may be an example of the processors 102 and 202 of FIG. 2.

Figure 7:
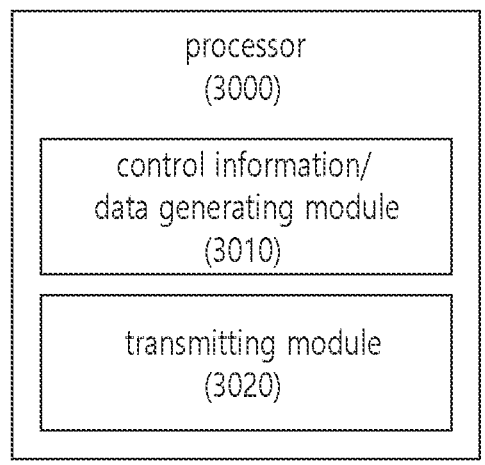
FIG. 7 shows an example of a processor 3000.

FIG. 7 shows an example of a processor 3000.

Referring to FIG. 7, the processor 3000 may include a control information/data generation module 3010 and a transmission module 3020. The processor 3000 may execute the methods described from the perspective of the transmitter in below. For example, the processor 3000 generates and transmits, to a user equipment (UE), first configuration information informing of a monitoring occasion for detecting first downlink control information (DCI) including information for whether the UE to wake-up. And the processor 3000 transmits, to the UE, second configuration information for an operation to be applied to the UE when the first DCI is not detected in the monitoring occasion. And the processor 3000 transmits the first DCI through a first PDCCH in the monitoring occasion. When the first DCI is transmitted or regardless of whether the first DCI is transmitted, based on the second configuration information, a second DCI other than the first DCI may be transmitted through a second PDCCH in a next DRX on duration. The processor 3000 may be an example of the processors 102 and 202 of FIG. 2.

Figure 8:
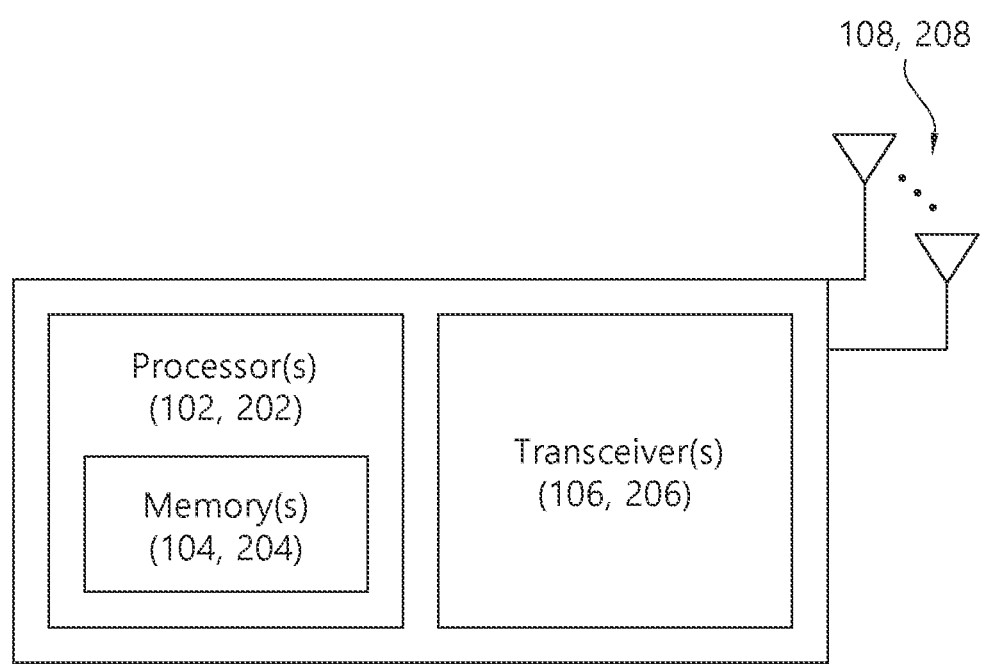
FIG. 8 shows another example of a wireless device.

FIG. 8 shows another example of a wireless device.

According to FIG. 8, a wireless device may include at least one processor 102, 202, at least one memory 104, 204, at least one transceiver 106, 206, and one or more antennas 108, 208.

The example of the wireless device described in FIG. 2 is different from the example of the wireless described in FIG. 8 in that the processors 102 and 202 and the memories 104 and 204 are separated in FIG. 2 whereas the memories 104 and 204 are included in the processors 102 and 202 in the example of FIG. 8. That is, the processor and the memory may constitute one chipset.

Figure 9:
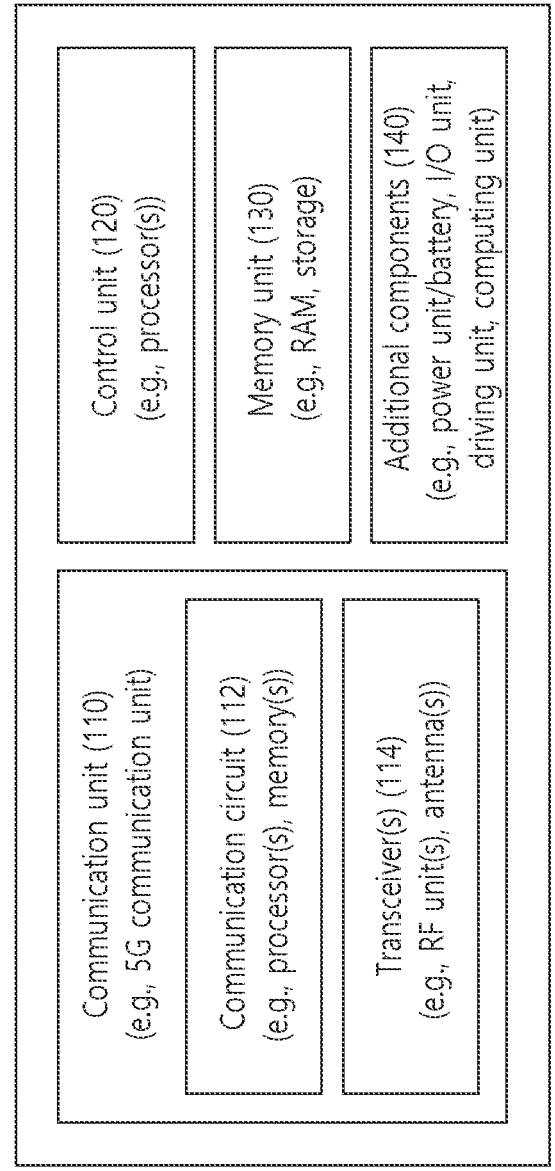
FIG. 9 shows another example of a wireless device applied to the present specification.

FIG. 9 shows another example of a wireless device applied to the present specification. The wireless device may be implemented in various forms according to a use-case/service.

Referring to FIG. 9, wireless devices 100 and 200 may correspond to the wireless devices of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BSs (200 of FIG. 1), a network node, etc. The wireless device may be used in a mobile or fixed place according to a use-example/service.

In FIG. 9, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. In addition, each element, component, unit/portion, and/or module within the wireless devices 100 and 200 may further include one or more elements. For example, the control unit 120 may be configured by a set of one or more processors. For example, the control unit 120 may be configured by a set of a communication control processor, an application processor, an Electronic Control Unit (ECU), a graphical processing unit, and a memory control processor. For another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 10:
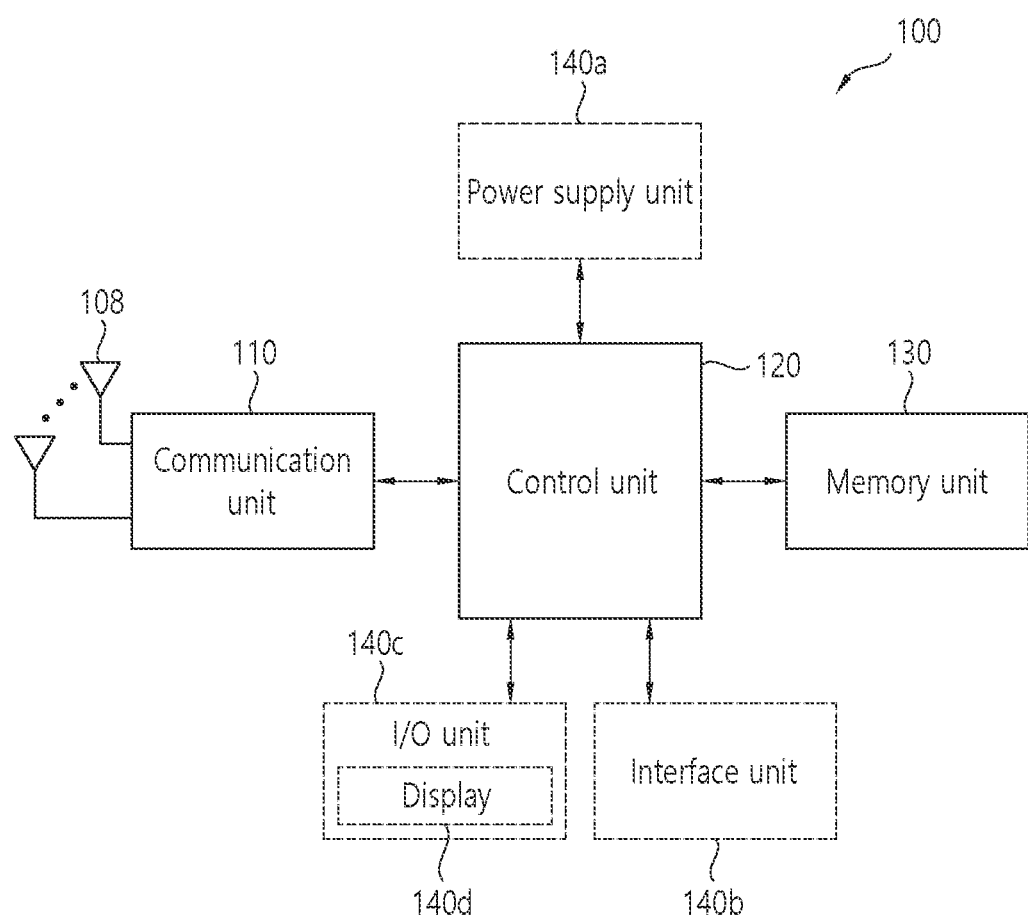
FIG. 10 illustrates a portable device applied to the present specification.

FIG. 10 illustrates a hand-held device applied to the present specification. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 10, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c respective correspond to the blocks 110 to 130/140 of FIG. 9.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

For example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. In addition, the communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 11:
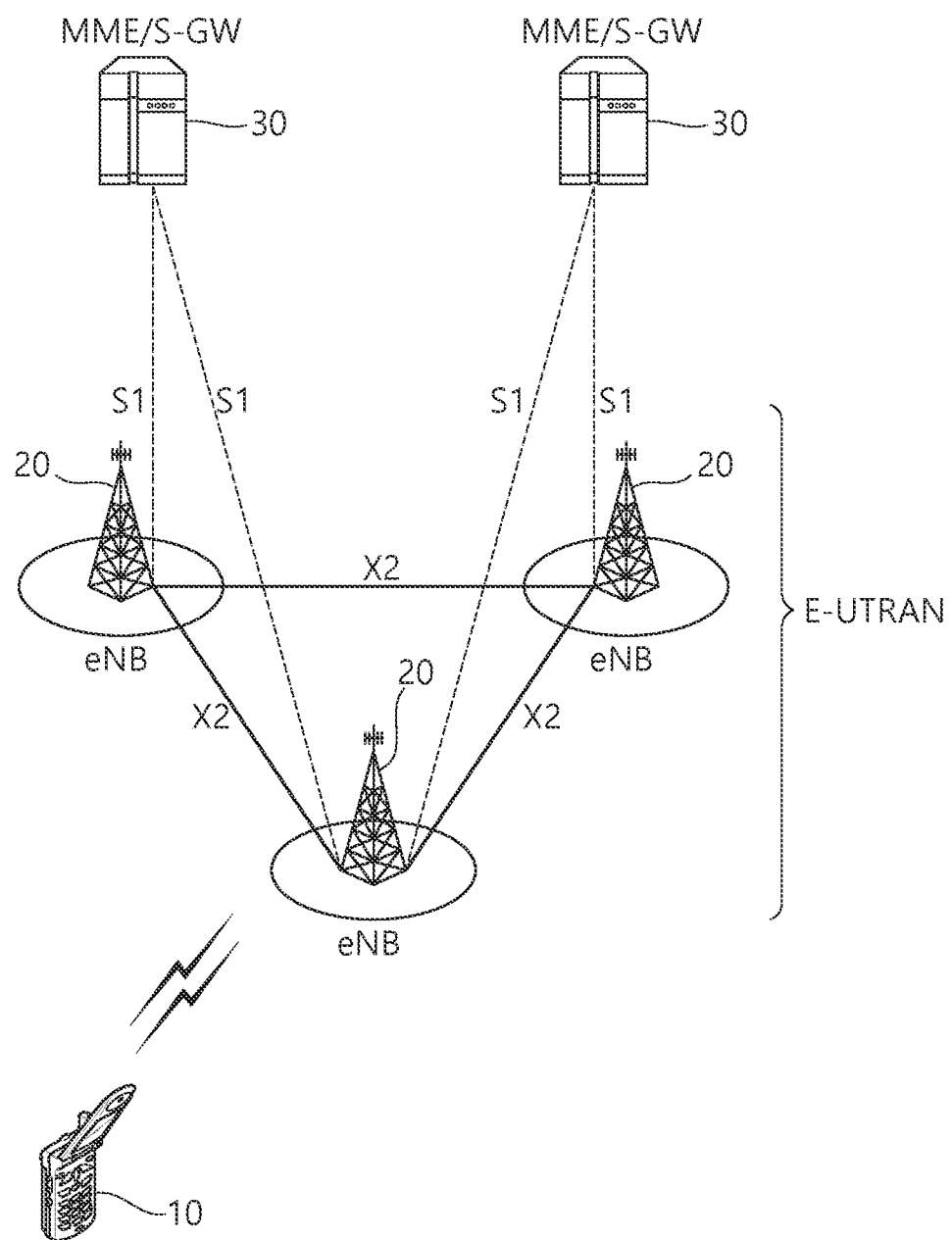
FIG. 11 shows a wireless communication system to which the present disclosure may be applied.

FIG. 11 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, terminal, etc. The BS 20 is generally a fixed station that communicates with the UE 10 and may be referred to as another terminology, such as an evolved node-B (eNB), a base transceiver system (BTS), an access point, gNB, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 12:
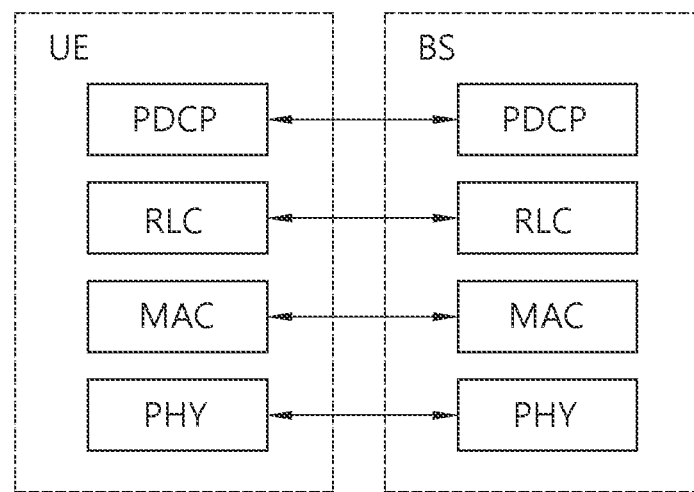
FIG. 12 is a diagram showing a wireless protocol architecture for a user plane.
Figure 13:
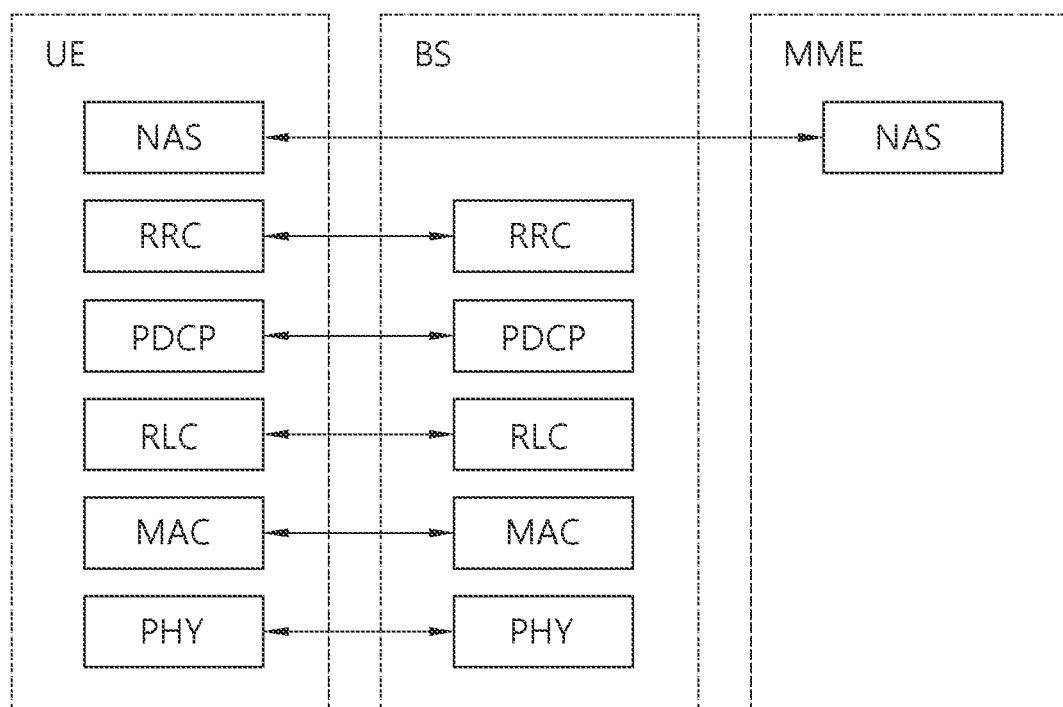
FIG. 13 is a diagram showing a wireless protocol architecture for a control plane.

FIG. 12 is a diagram showing a wireless protocol architecture for a user plane. FIG. 13 is a diagram showing a wireless protocol architecture for a control plane. The user plane is a protocol stack for user data transmission. The control plane is a protocol stack for control signal transmission.

Referring to FIGS. 12 and 13, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 14:
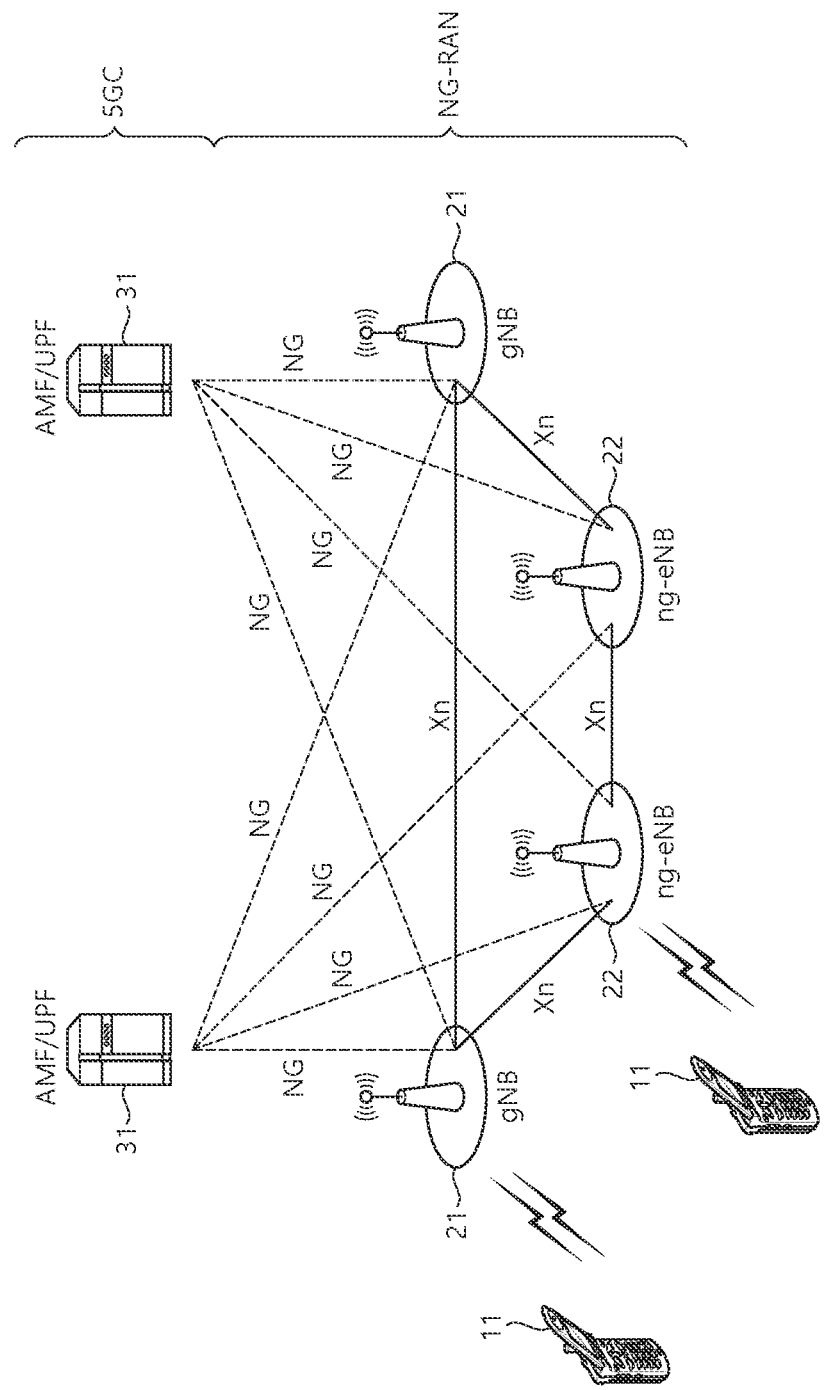
FIG. 14 illustrates a system structure of a New Generation Radio Access Network (NG-RAN) to which NR is applied.

FIG. 14 illustrates a system structure of a next generation radio access network (NG-RAN) to which NR is applied.

Referring to FIG. 14, the NG-RAN may include a gNB and/or an eNB that provides user plane and control plane protocol termination to a UE 11. The gNB 21 and the eNB (ng-eNB) 22 are connected by an Xn interface. The gNB and the eNB are connected to a 5G core network (5GC) via an NG interface. More specifically, the gNB and the eNB may be connected to an access and mobility management function (AMF) 31 via an NG-C interface and connected to a user plane function (UPF) 31 via an NG-U interface.

Figure 15:
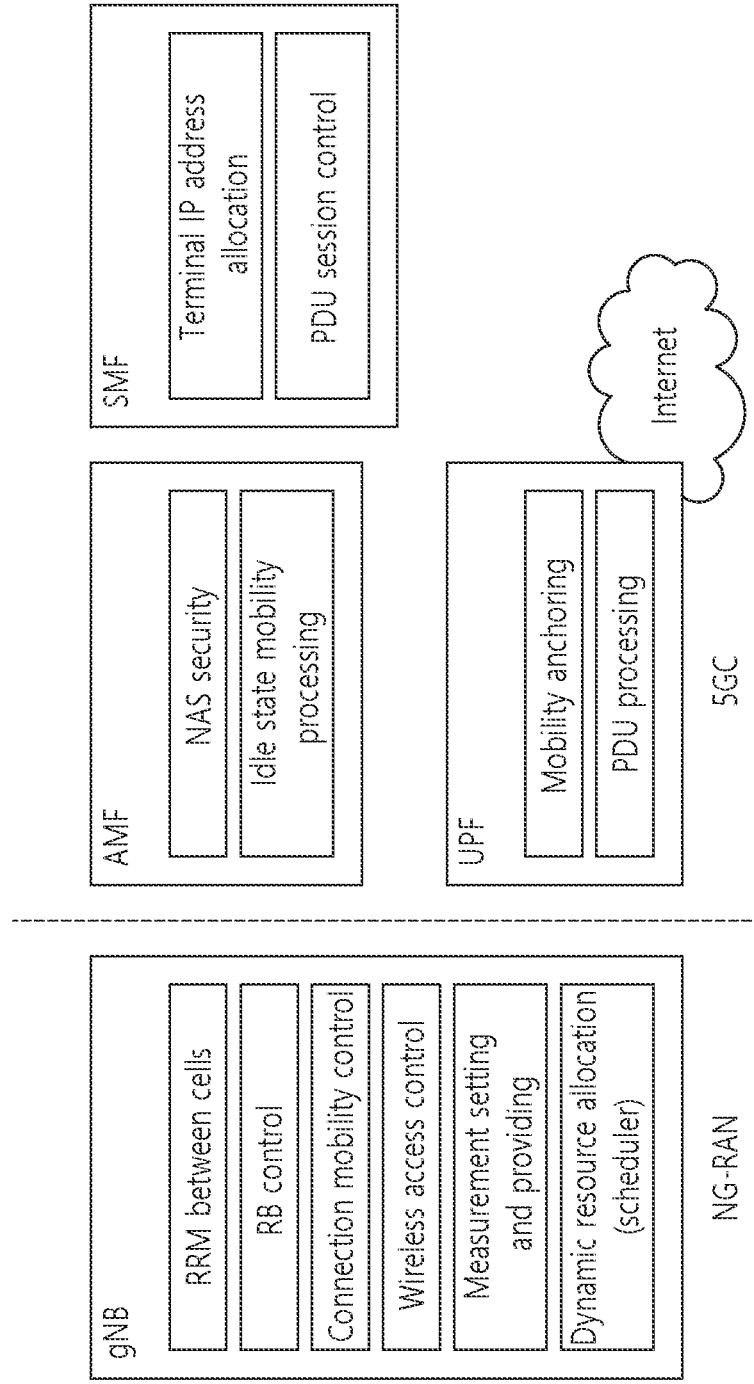
FIG. 15 illustrates a functional division between an NG-RAN and a 5GC.

FIG. 15 illustrates a functional division between an NG-RAN and a 5GC.

Referring to FIG. 15, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 16:
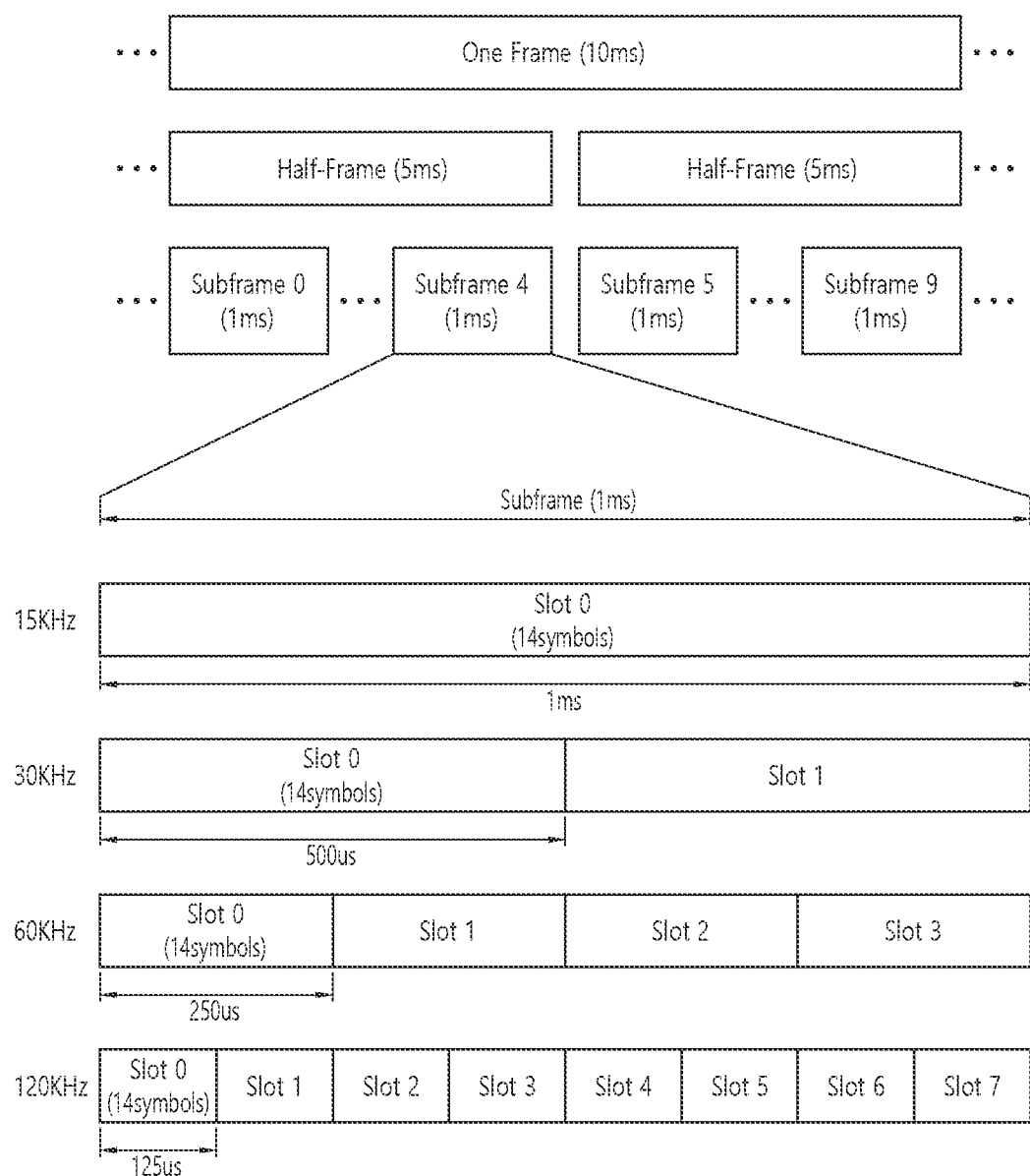
FIG. 16 illustrates an example of a frame structure that may be applied in NR.

FIG. 16 illustrates an example of a frame structure that may be applied in NR.

Referring to FIG. 16, a radio frame (which may be called as a frame hereinafter) may be used for uplink and downlink transmission in NR. A frame has a length of 10 ms and may be defined as two 5 ms half-frames (Half-Frame, HF). A half-frame may be defined as five 1 ms subframes (Subframe, SF). A subframe may be divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbol may include an OFDM symbol (or a CP-OFDM symbol) and an SC-FDMA symbol (or a DFT-s-OFDM symbol).

The following table 1 illustrates a subcarrier spacing configuration

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 16, μ=0, 1, 2, and 3 are exemplified.

Table 2-1 below exemplifies that the number of symbols per slot, the number of slots per frame, and the number of slots per subframe vary according to SCS (μ=2, 60 KHz) when the extended CP is used.

TABLE 2-1

| μ | $N^{slot}_{symb}$ | $N^{frame,u}_{slot}$ | $N^{subframe,u}_{slot}$ |
|---|---|---|---|
| 2 | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 17:
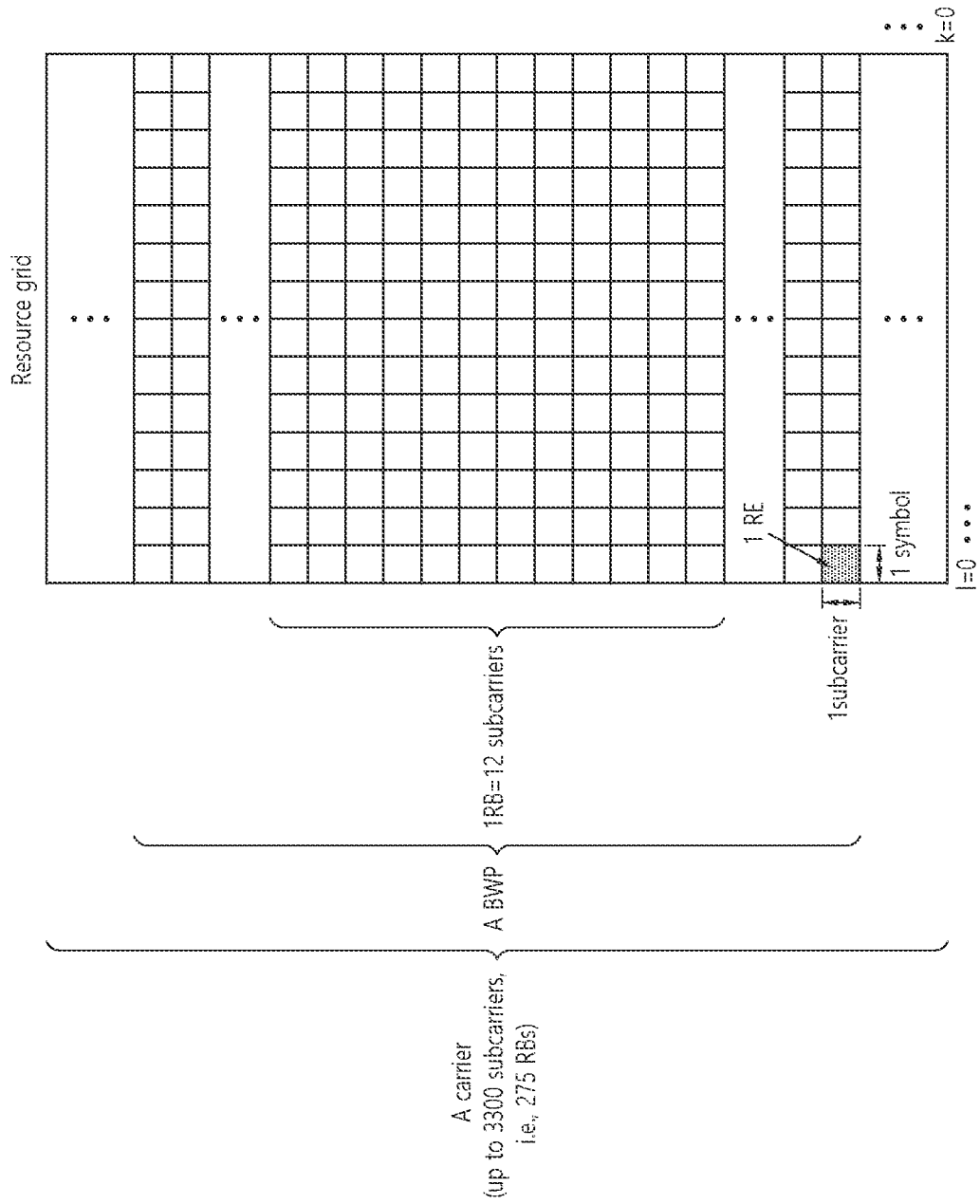
FIG. 17 illustrates a slot structure of the NR frame.

FIG. 17 illustrates a slot structure of a NR frame.

A slot may comprise a plurality of symbols in a time domain. For example, in case of a normal CP, one slot may include 7 symbols. However, in case of an extended CP, one slot may include 6 symbols. The carrier may include a plurality of subcarriers in a frequency domain. A resource block (RB) may be defined as a plurality of consecutive subcarriers (e.g., 12) in the frequency domain. A bandwidth part (BWP) may be defined as a plurality of consecutive (P)RBs in the frequency domain, and may correspond to one numerology (e.g., SCS, CP length, etc.). A carrier may include a maximum of N (e.g., 5) BWPs. Data communication is performed through the activated BWP, and only one BWP can be activated for one UE. Each element in the resource grid is referred to as a resource element (RE), and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring means decoding each PDCCH candidate according to a downlink control information (DCI) format. The UE monitors a set of PDCCH candidates in one or more CORESETs (described below) on the activated DL BWP of each activated serving cell for which PDCCH monitoring is configured according to a corresponding search space set.

A new unit called a control resource set (CORESET) may be introduced in the NR. The UE may receive a PDCCH in the CORESET.

Figure 18:
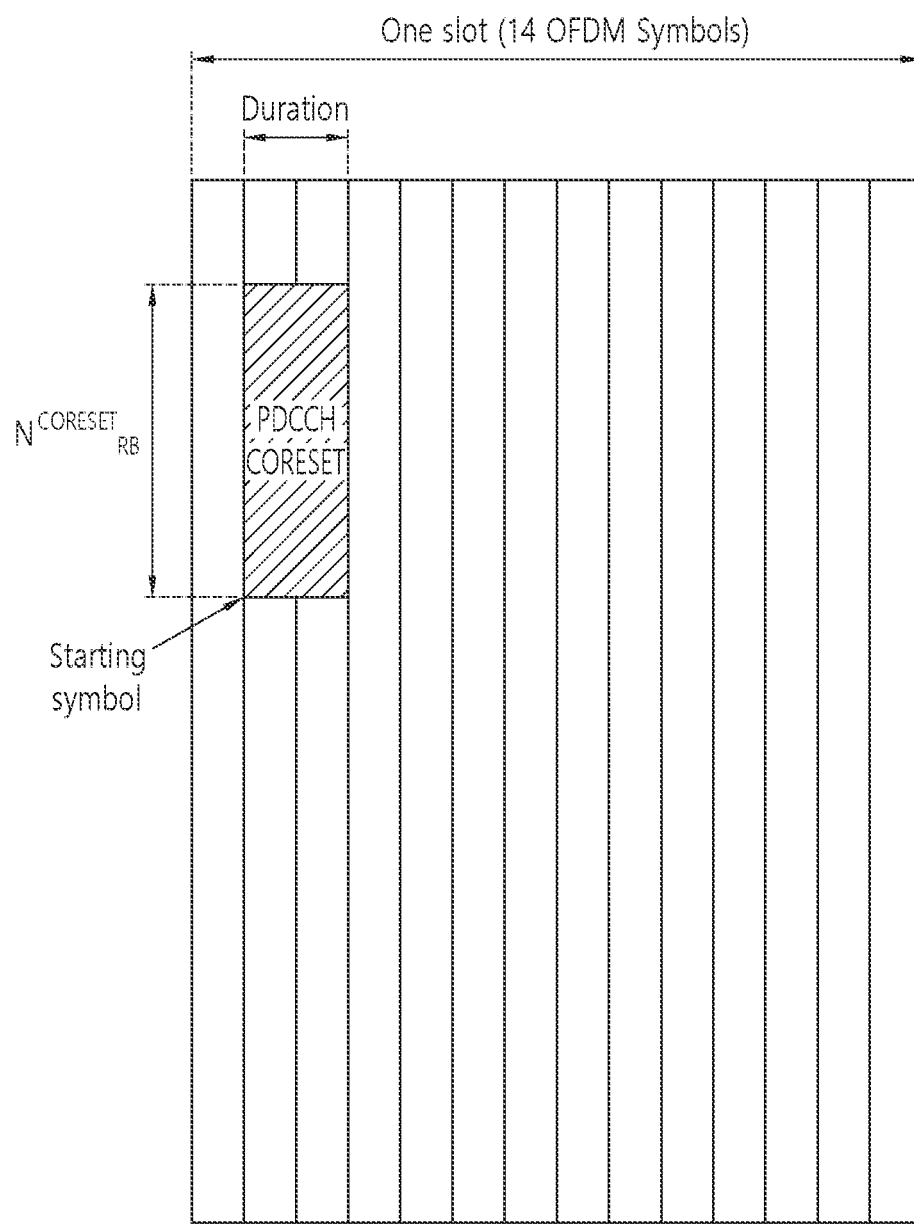
FIG. 18 illustrates a CORESET.

FIG. 18 illustrates a CORESET.

Referring to FIG. 18, the CORESET includes $N^{CORESET}_{RB}$ resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. A plurality of CCEs (or REGs) may be included in the CORESET. One CCE may be composed of a plurality of resource element groups (REGs), and one REG may include one OFDM symbol in the time domain and 12 resource elements in the frequency domain.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 19:
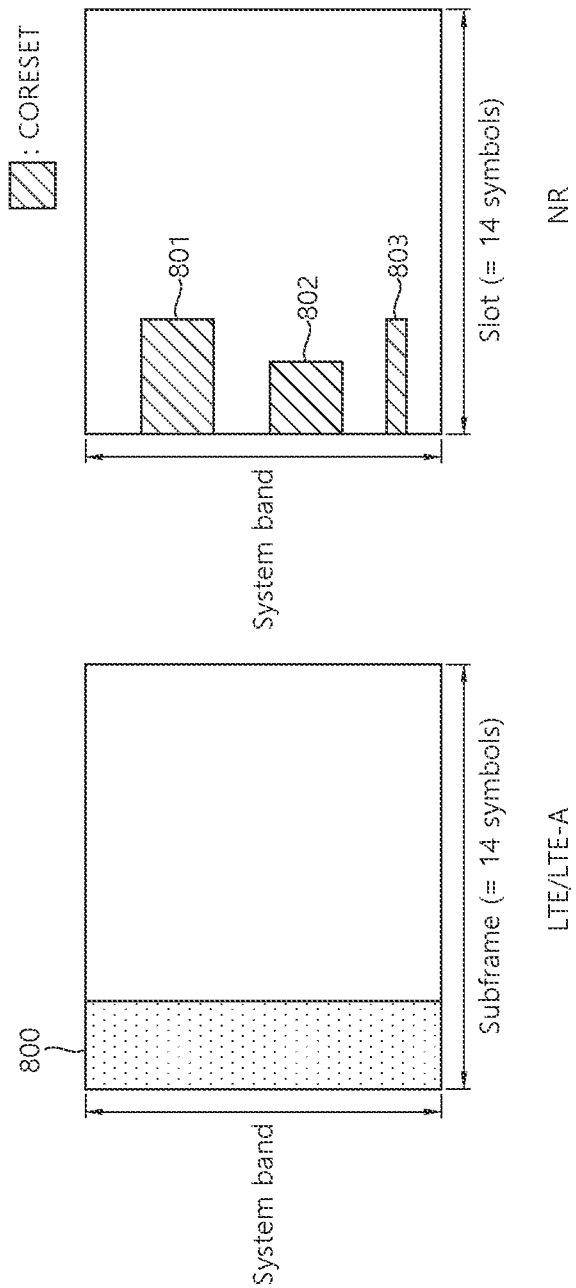
FIG. 19 is a diagram illustrating a difference between a conventional control region and the CORESET in NR.

FIG. 19 is a diagram illustrating a difference between a conventional control region and the CORESET in NR.

Referring to FIG. 19, a control region 800 in the conventional wireless communication system (e.g., LTE/LTE-A) is configured over the entire system band used by a base station (BS). All the UEs, excluding some (e.g., eMTC/NB-IoT UE) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the UE and may use only a portion, rather than the entirety of the system bandwidth in the frequency domain. In addition, in the time domain, only some of the symbols in the slot may be used. The BS may allocate the CORESET to each UE and may transmit control information through the allocated CORESET. For example, in FIG. 19, a first CORESET 801 may be allocated to UE 1, a second CORESET 802 may be allocated to UE 2, and a third CORESET 803 may be allocated to UE 3. In the NR, the UE may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 20:
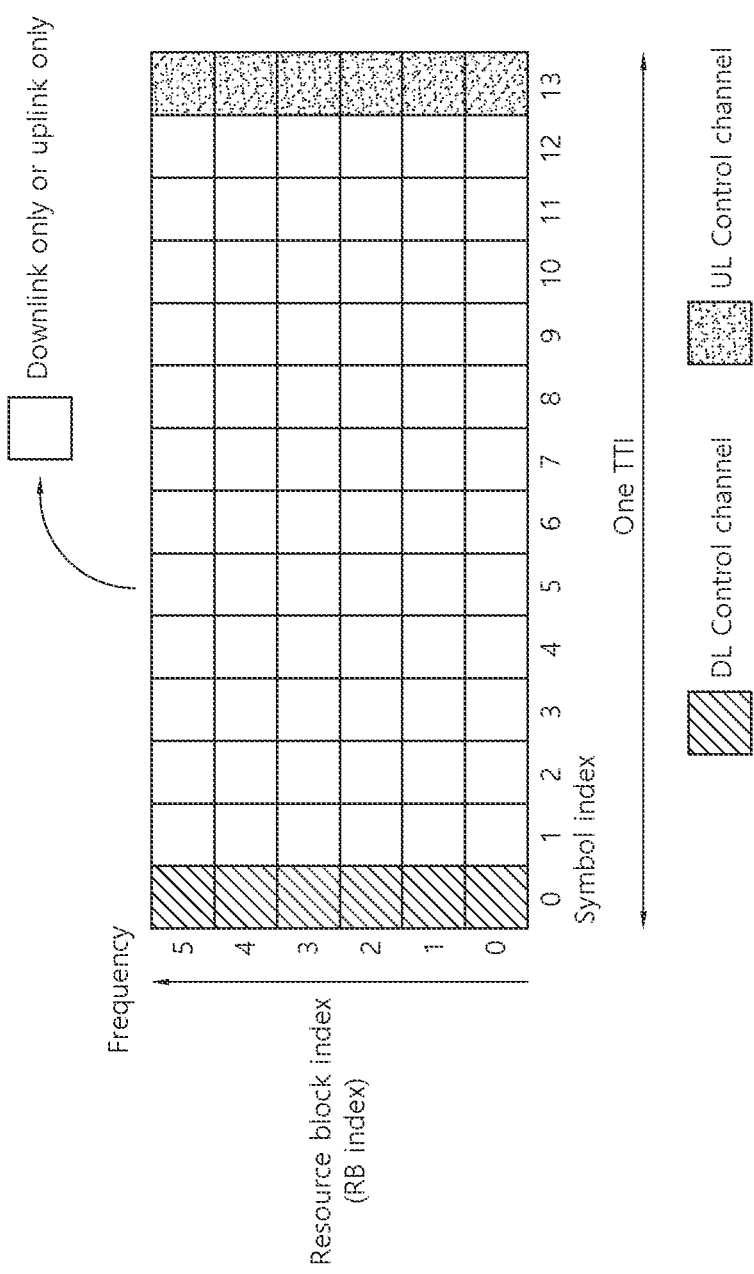
FIG. 20 illustrates an example of a frame structure for new radio access technology.

FIG. 20 illustrates an example of a frame structure for new radio access technology.

In NR, a structure in which a control channel and a data channel are time-division-multiplexed within one TTI, as shown in FIG. 20, can be considered as a frame structure in order to minimize latency.

In FIG. 20, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 21:
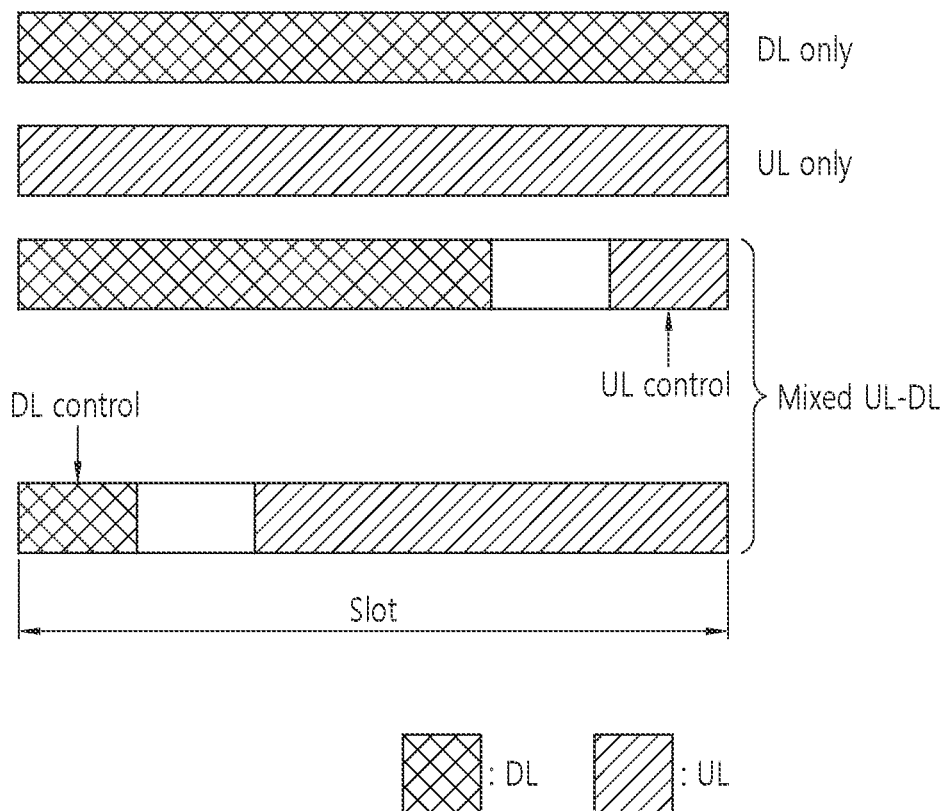
FIG. 21 illustrates a structure of self-contained slot.

FIG. 21 illustrates a structure of self-contained slot.

In NR system, one slot includes all of a DL control channel, DL or UL data channel, UL control channel, and so on. For example, the first N symbols in a slot may be used for transmitting a DL control channel (in what follows, DL control region), and the last M symbols in the slot may be used for transmitting an UL control channel (in what follows, UL control region). N and M are each an integer of 0 or larger. A resource region located between the DL and UL control regions (in what follows, a data region) may be used for transmission of DL data or UL data. As one example, one slot may correspond to one of the following configurations. Each period is listed in the time order.

1. DL only configuration
2. UL only configuration
3. Mixed UL-DL configuration

DL region+GP (Guard Period)+UL control region

DL control region+GP+UL region a DL region: (i) a DL data region, (ii) DL control region plus DL data region a UL region: (i) an UL data region, (ii) UL data region plus UL control region.

In the DL control region, a PDCCH may be transmitted, and in the DL data region, a PDSCH may be transmitted. In the UL control region, a PUCCH may be transmitted, and in the UL data region, a PUSCH may be transmitted. In the PDCCH, Downlink Control Information (DCI), for example, DL data scheduling information or UL data scheduling information may be transmitted. In the PUCCH, Uplink Control Information (UCI), for example, ACK/NACK (Positive Acknowledgement/Negative Acknowledgement) information with respect to DL data, Channel State Information (CSI) information, or Scheduling Request (SR) may be transmitted. A GP provides a time gap during a process where a gNB and a UE transition from the transmission mode to the reception mode or a process where the gNB and UE transition from the reception mode to the transmission mode. Part of symbols belonging to the occasion in which the mode is changed from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

System information of the NR system may be transmitted in a broadcasting manner. In this case, in one symbol, analog beams belonging to different antenna panels may be simultaneously transmitted. A scheme of introducing a beam RS (BRS) which is a reference signal (RS) transmitted by applying a single analog beam (corresponding to a specific antenna panel) is under discussion to measure a channel per analog beam. The BRS may be defined for a plurality of antenna ports, and each antenna port of the BRS may correspond to a single analog beam. In this case, unlike the BRS, a synchronization signal or an xPBCH may be transmitted by applying all analog beams within an analog beam group so as to be correctly received by any UE.

In the NR, in a time domain, a synchronization signal block (SSB, or also referred to as a synchronization signal and physical broadcast channel (SS/PBCH)) may consist of 4 OFDM symbols indexed from 0 to 3 in an ascending order within a synchronization signal block, and a primary synchronization signal (PSS), secondary synchronization signal (SSS), and a PBCH associated with demodulation reference signal (DMRS) may be mapped to the symbols. As described above, the synchronization signal block may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, transmission and reception may be performed based on beams. If reception performance of a current serving beam is degraded, a process of searching for a new beam through the so-called Beam Failure Recovery (BFR) may be performed.

Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process associated with a beam yielding a good measurement result.

Now, a transmission configuration indicator (hereinafter, TCI) state will be described. The TCI state may be configured for each CORESET of a control channel, and may determine a parameter for determining an RX beam of the UE, based on the TCI state.

For each DL BWP of a serving cell, a UE may be configured for three or fewer CORESETs. Also, a UE may receive the following information for each CORESET.

1) CORESET index p (e.g., one of 0 to 11, where index of each CORESET may be determined uniquely among BWPs of one serving cell), 2) PDCCH DM-RS scrambling sequence initialization value, 3) Duration of a CORESET in the time domain (which may be given in symbol units), 4) Resource block set, 5) CCE-to-REG mapping parameter, 6) Antenna port quasi co-location indicating quasi co-location (QCL) information of a DM-RS antenna port for receiving a PDCCH in each CORESET (from a set of antenna port quasi co-locations provided by a higher layer parameter called 'TCI-State'), 7) Indication of presence of Transmission Configuration Indication (TCI) field for a specific DCI format transmitted by the PDCCH in the CORESET, and so on.

QCL will be described. If a characteristic of a channel through which a symbol on one antenna port is conveyed can be inferred from a characteristic of a channel through which a symbol on the other antenna port is conveyed, the two antenna ports are said to be quasi co-located (QCLed). For example, when two signals A and B are transmitted from the same transmission antenna array to which the same/similar spatial filter is applied, the two signals may go through the same/similar channel state. From a perspective of a receiver, upon receiving one of the two signals, another signal may be detected by using a channel characteristic of the received signal.

In this sense, when it is said that the signals A and B are quasi co-located (QCLed), it may mean that the signals A and B have went through a similar channel condition, and thus channel information estimated to detect the signal A is also useful to detect the signal B. Herein, the channel condition may be defined according to, for example, a Doppler shift, a Doppler spread, an average delay, a delay spread, a spatial reception parameter, or the like.

A 'TCI-State' parameter associates one or two downlink reference signals to corresponding QCL types (QCL types A, B, C, and D, see Table 4).

TABLE 4

| QCL Type | Description |
| --- | --- |
| QCL-TypeA | Doppler shift, Doppler spread, Average delay, Delay spread |
| QCL-TypeB | Doppler shift, Doppler spread |
| QCL-TypeC | Doppler shift, Average delay |
| QCL-TypeD | Spatial Rx parameter |

Each 'TCI-State' may include a parameter for configuring a QCL relation between one or two downlink reference signals and a DM-RS port of a PDSCH (or PDDCH) or a CSI-RS port of a CSI-RS resource.

Meanwhile, for each DL BWP configured to a UE in one serving cell, the UE may be provided with 10 (or less) search space sets. For each search space set, the UE may be provided with at least one of the following information.

1) search space set index s (0≤s<40), 2) an association between a CORESET p and the search space set s, 3) a PDCCH monitoring periodicity and a PDCCH monitoring offset (slot unit), 4) a PDCCH monitoring pattern within a slot (e.g., indicating a first symbol of a CORSET in a slot for PDCCH monitoring), 5) the number of slots in which the search space set s exists, 6) the number of PDCCH candidates per CCE aggregation level, 7) information indicating whether the search space set s is CSS or USS.

In the NR, a CORESET #0 may be configured by a PBCH (or a UE-dedicated signaling for handover or a PSCell configuration or a BWP configuration). A search space (SS) set #0 configured by the PBCH may have monitoring offsets (e.g., a slot offset, a symbol offset) different for each associated SSB. This may be required to minimize a search space occasion to be monitored by the UE. Alternatively, this may be required to provide a beam sweeping control/data region capable of performing control/data transmission based on each beam so that communication with the UE is persistently performed in a situation where a best beam of the UE changes dynamically.

Figure 22:
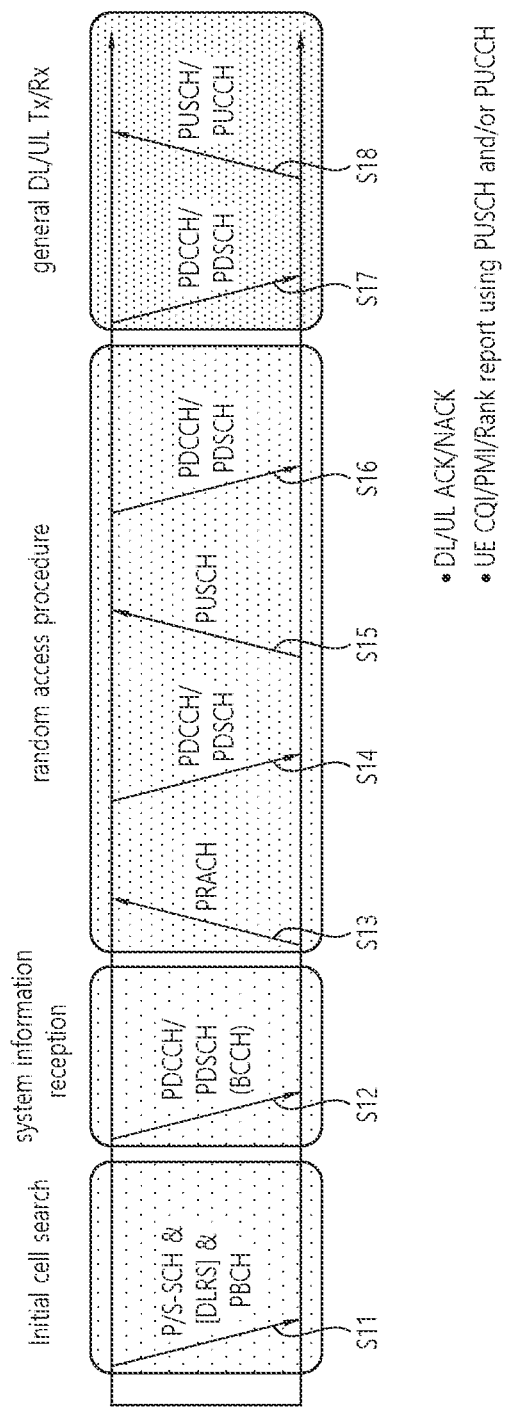
FIG. 22 illustrates in more detail the initial access and signal transmission in the general subsequent process.

FIG. 22 illustrates in more detail the initial access and signal transmission in the subsequent process.

Referring to FIG. 22, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13-S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (NACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

In order to enable reasonable battery consumption when bandwidth adaptation (BA) is configured, only one uplink BWP and one downlink BWP or only one downlink/uplink BWP pair for each uplink carrier may be activated at once in an active serving cell, and all other BWPs configured in the UE are deactivated. In the deactivated BWPs, the UE does not monitor the PDCCH, and does not perform transmission on the PUCCH, PRACH, and UL-SCH.

For the BA, RX and TX bandwidths of the UE are not necessarily as wide as a bandwidth of a cell, and may be adjusted. That is, it may be commanded such that a width is changed (e.g., reduced for a period of low activity for power saving), a position in a frequency domain is moved (e.g., to increase scheduling flexibility), and a subcarrier spacing is changed (e.g., to allow different services). A subset of the entire cell bandwidth of a cell is referred to as a bandwidth part (BWP), and the BA is acquired by configuring BWP(s) to the UE and by notifying the UE about a currently active BWP among configured BWPs. When the BA is configured, the UE only needs to monitor the PDCCH on one active BWP. That is, there is no need to monitor the PDCCH on the entire downlink frequency of the cell. A BWP inactive timer (independent of the aforementioned DRX inactive timer) is used to switch an active BWP to a default BWP. That is, the timer restarts when PDCCH decoding is successful, and switching to the default BWP occurs when the timer expires.

Figure 23:
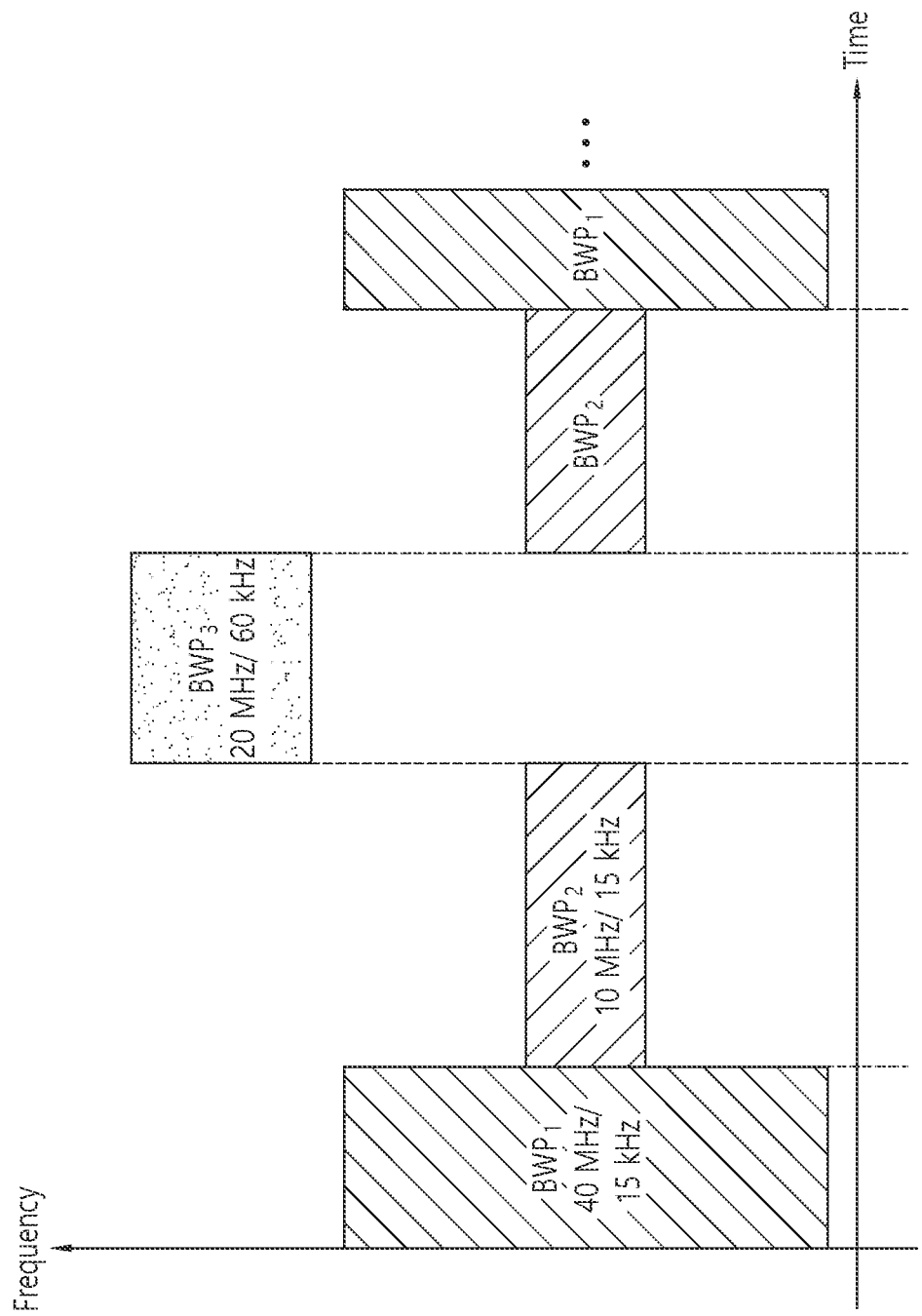
FIG. 23 illustrates a scenario in which three different bandwidth parts are set.

FIG. 23 illustrates a scenario in which three different bandwidth parts are configured.

FIG. 23 shows an example in which $BWP_1$, $BWP_2$, and $BWP_3$ are configured on a time-frequency resource. The $BWP_1$ may have a width of 40 MHz and a subcarrier spacing of 15 kHz. The $BWP_2$ may have a width of 10 MHz and a subcarrier spacing of 15 kHz. The $BWP_3$ may have a width of 20 MHz and a subcarrier spacing of 60 kHz. In other words, each BWP may have a different width and/or a different subcarrier spacing.

Now, discontinuous reception (DRX) will be described.

Figure 24:
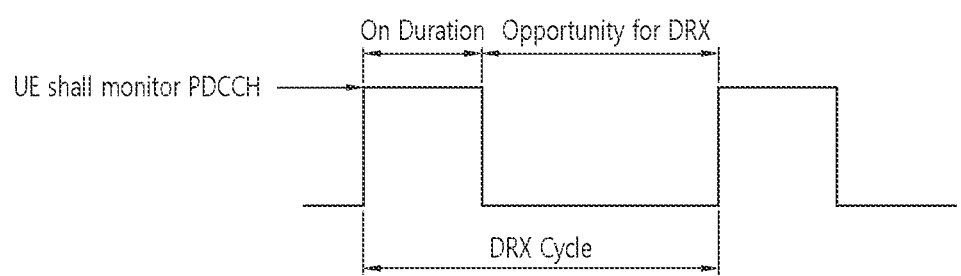
FIG. 24 illustrates a DRX cycle.

FIG. 24 illustrates a DRX cycle.

Referring to FIG. 24, the DRX cycle includes an 'on duration' (hereinafter, also referred to as a 'DRX on duration') and an 'opportunity for DRX'. The DRX cycle defines a time interval in which the on duration is cyclically repeated. The on duration indicates a time duration in which a UE performs monitoring to receive a PDCCH (More specifically, monitoring PDCCH to detect DCI). If DRX is configured, the UE performs PDCCH monitoring during the 'on duration'. If there is a PDCCH successfully detected during the PDCCH monitoring, the UE operates an inactivity timer and maintains an awake state. On the other hand, if there is no PDCCH successfully detected during the PDCCH monitoring, the UE enters a sleep state after the 'on duration' ends.

Table 5 shows a UE procedure related to DRX (RRC_CONNECTED state). Referring to Table 5, DRX configuration information may be received through higher layer (e.g., RRC) signaling. Whether DRX is ON or OFF may be controlled by a DRX command of a MAC layer. If the DRX is configured, PDCCH monitoring may be performed discontinuously.

TABLE 5

| | Type of signals | UE procedure |
|---|---|---|
| 1$^{st}$ step | RRC signalling (MAC-CellGroupConfig) | Receive DRX configuration information |
| 2$^{nd}$ step | MAC CE ((Long) DRX command MAC CE) | Receive DRX command |
| 3$^{rd}$ step | — | Monitor a PDCCH during an on duration of a DRX cycle |

MAC-CellGroupConfig may include configuration information required to configure a medium access control (MAC) parameter for a cell group. MAC-CellGroupConfig may also include configuration information regarding DRX. For example, MAC-CellGroupConfig may include information for defining DRX as follows.

Value of drx-OnDurationTimer: This defines a length of a starting duration of a DRX cycle.

Value of drx-InactivityTimer: This defines a length of a time duration in which the UE is in an awake state, after a PDCCH occasion in which a PDCCH indicating initial UL or DL data is detected.

Value of drx-HARQ-RTT-TimerDL: This defines a length of a maximum time duration until DL retransmission is received, after DL initial transmission is received.

Value of drx-HARQ-RTT-TimerUL: This defines a length of a maximum time duration until a grant for UL retransmission is received, after a grant for UL initial transmission is received.

drx-LongCycleStartOffset: This defines a time length and a starting point of a DRX cycle drx-ShortCycle (optional): This defines a time length of a short DRX cycle.

Herein, if any one of drx-OnDurationTimer, drx-InactivityTimer, drx-HARQ-RTT-TimerDL, and drx-HARQ-RTT-TimerUL is operating, the UE performs PDCCH monitoring in every PDCCH occasion while maintaining an awake state.

The UE may know a starting point of a DRX cycle, a duration (duration time) of the DRX cycle, a starting point of an on duration timer, and a duration of the on duration timer according to a DRX configuration. Thereafter, the UE attempts reception/detection for scheduling information (i.e., PDCCH) within the on duration of each DRX cycle (this may be represented that scheduling information is monitored).

If the scheduling information (PDCCH) is detected within the on duration of the DRX cycle (DRX on duration), an inactivity timer is activated, and detection is attempted for another scheduling information during a given inactivity timer duration (a time duration in which the inactivity timer runs). In this case, the on duration and the inactivity timer duration in which the UE performs the signal reception/detection operation may be together referred to as an active time. If the scheduling information is not detected in the on duration, only the on duration may be the active time.

When the inactivity timer ends without reception/detection of an additional signal (a control signal or data), the UE does not perform scheduling information and corresponding DL reception/UL transmission until an on duration of a next DRX cycle (a DRX on duration) starts after the inactivity timer ends.

A duration adjustment of a DRX cycle, a duration adjustment of an on duration timer/inactivity timer, or the like plays an important role in determining whether the UE sleeps. According to the setting for a corresponding parameter, the network may configure the UE to frequently sleep or continuously perform monitoring on the scheduling information. This may act as an element for determining whether power saving of the UE will be achieved.

Meanwhile, in NR, a wake up signal (WUS) is considered to save power of the UE and a new DCI for WUS (which may be referred to as WUS DCI) is being considered. The present disclosure proposes a configuration for WUS DCI transmission/reception or a fallback operation for a case where WUS DCI transmission/reception is not smooth.

Figure 25:
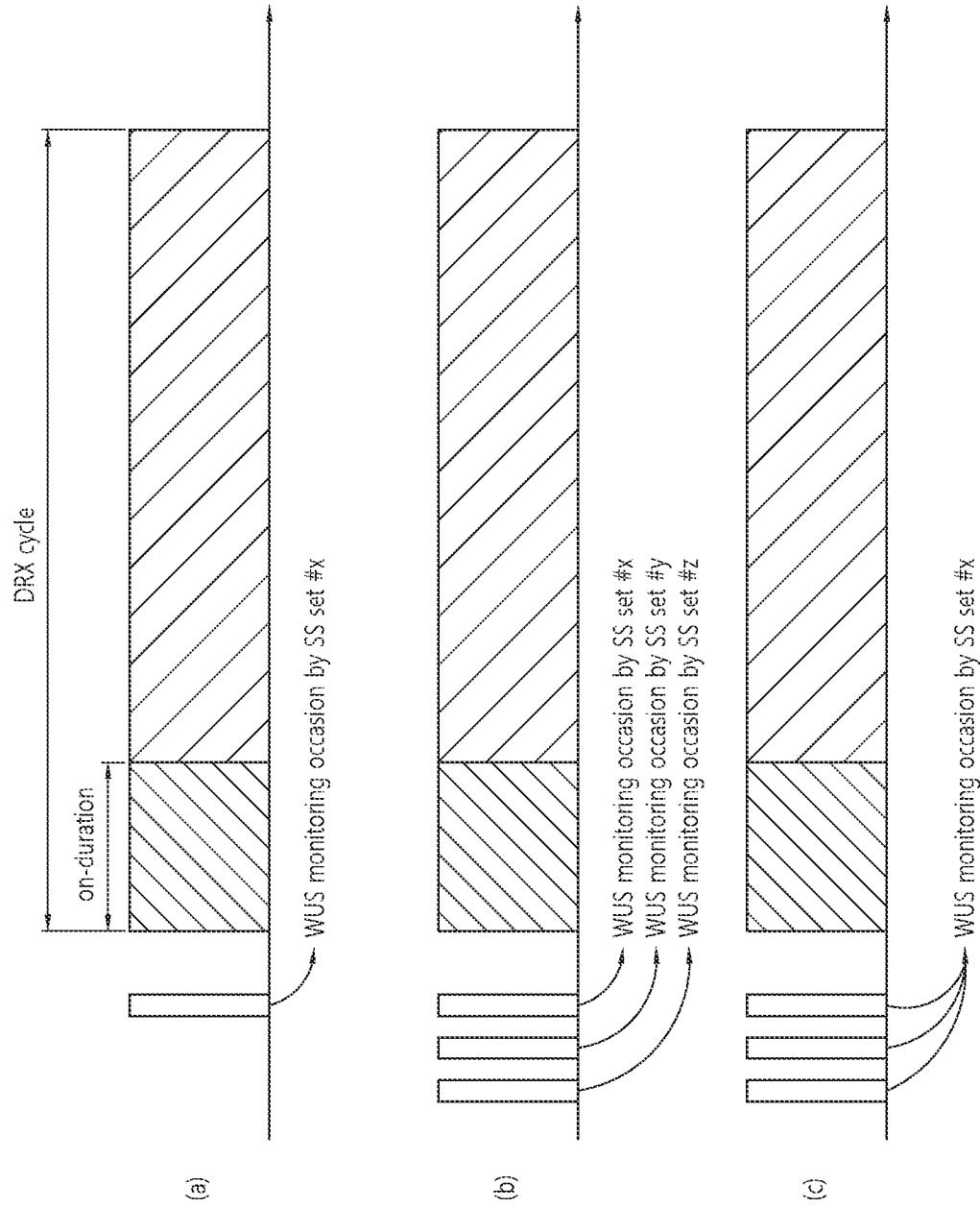
FIG. 25 shows an example of a method of setting a WUS monitoring occasion.

FIG. 25 shows an example of a method of setting a WUS monitoring occasion.

FIG. 25 (a) shows a case in which WUS DCI monitoring is performed at a monitoring occasion designated by a search space set (SS set) #x is shown, and a case in which one monitoring occasion is set for one DRX cycle is shown. FIGS. 25 (b) and (c) show a case in which a plurality of monitoring occasions are set for one DRX cycle in order to respond to a case where WUS DCI cannot be transmitted. In the case of (b) of FIG. 25, when the search space sets #x, #y, and #z are linked to different CORESETs assuming different TCIs, a diversity effect on TCI can be expected. In the case of (c) of FIG. 25, by setting the duration of one search space set (search space set #x), a number of monitoring occasions (three in FIG. 25 (c)) are set for each monitoring period. In addition, although not shown in FIG. 25, when there are a plurality of DRX cycles associated with a monitoring occasion, it may operate so that whether to wake up of a plurality of DRX cycles is determined by one WUS DCI. In the following description, a monitoring occasion may mean a monitoring occasion configured as one monitoring occasion such as FIG. 25 (a) or monitoring occasion set such as FIG. 25 (b) and (c) linked to one or multiple DRX cycles.

As described above, the WUS may be provided in the form of a DCI format and may be transmitted through a PDCCH. Accordingly, WUS monitoring may have the same meaning as monitoring PDCCH to detect the DCI format.

Figure 26:
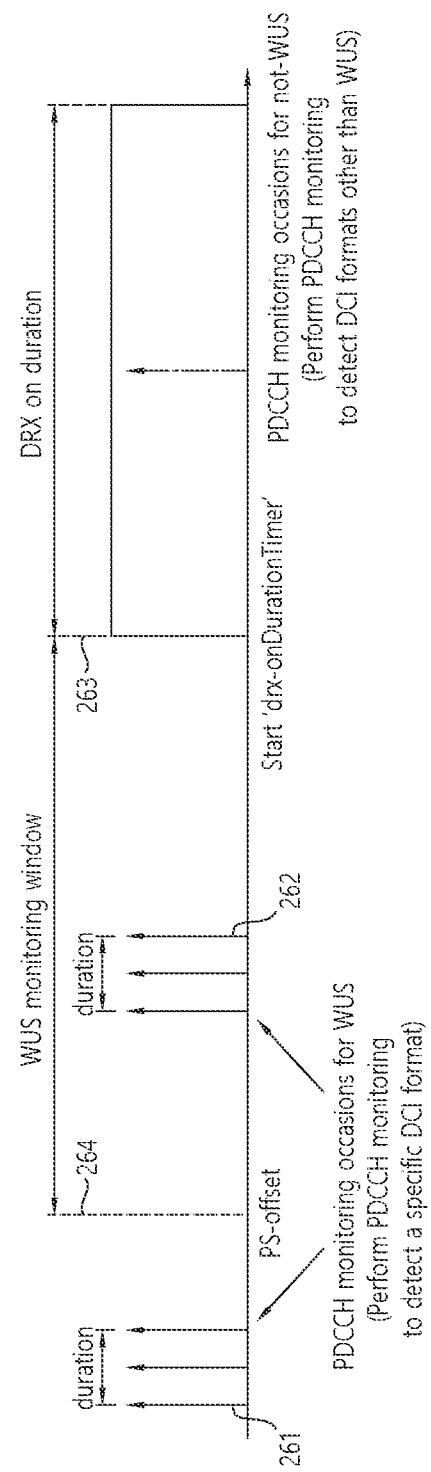
FIG. 26 illustrates a time relationship between a WUS monitoring occasion and a DRX on duration.

FIG. 26 illustrates a time relationship between a WUS monitoring occasion and a DRX on duration.

Referring to FIG. 26, the WUS monitoring occasion may be determined, for example, based on a message setting a search space (set). Here, the WUS may be a DCI format including a wake-up indication. For example, DCI format 2_6 is a DCI format used to inform the UE of power saving information outside the DRX active time. DCI format 2_6 may include, for example, a wake-up indication (1 bit), information related to dormancy of the secondary cell, and the like. This DCI format is transmitted through the PDCCH. Accordingly, the WUS monitoring may be expressed as one of PDCCH monitoring. An occasion to monitor the WUS may be determined by a message for setting a search space (set).

The following table is an example of a message for setting a search space (set).

TABLE 6

```
-- ASN1START
-- TAG-SEARCHSPACE-START
SearchSpace ::=                             SEQUENCE {
    searchSpaceId                               SearchSpaceId,
    controlResourceSetId                        ControlResourceSetId
    OPTIONAL,    -- Cond SetupOnly
    monitoringSlotPeriodicityAndOffset          CHOICE {
        sl1                                         NULL,
        sl2                                         INTEGER (0..1),
        sl4                                         INTEGER (0..3),
        sl5                                         INTEGER (0..4),
        sl8                                         INTEGER (0..7),
        sl10                                        INTEGER (0..9),
        sl16                                        INTEGER (0..15),
        sl20                                        INTEGER (0..19),
        sl40                                        INTEGER (0..39),
        sl80                                        INTEGER (0..79),
        sl160                                       INTEGER (0..159),
        sl320                                       INTEGER (0..319),
        sl640                                       INTEGER (0..639),
        sl1280                                      INTEGER (0..1279),
        sl2560                                      INTEGER (0..2559)
    }
    OPTIONAL,    -- Cond Setup
    duration                                    INTEGER (2..2559)       OPTIONAL,   -- NeedR
    monitoringSymbolsWithinSlot                 BIT STRING (SIZE (14))  OPTIONAL,   -- Cond Setup
    nrofCandidates                              SEQUENCE{
        aggregationLevel1                           ENUMERATED {n0, n1, n2, n3, n4, n5, n6, n8},
        aggregationLevel2                           ENUMERATED {n0, n1, n2, n3, n4, n5, n6, n8},
        aggregationLevel4                           ENUMERATED {n0, n1, n2, n3, n4, n5, n6, n8},
        aggregationLevel8                           ENUMERATED {n0, n1, n2, n3, n4, n5, n6, n8},
        aggregationLevel16                          ENUMERATED {n0, n1, n2, n3, n4, n5, n6, n8}
    }                                           OPTIONAL,   -- Cond Setup
    searchSpaceType                             CHOICE {
        common                                      SEQUENCE {
            dci-Format0-0-AndFormat1-0                  SEQUENCE {
            ...
            }                                           OPTIONAL,   -- Need R
            dci-Format2-0                               SEQUENCE {
                nrofCandidates-SFI                          SEQUENCE {
                    aggregationLevel1                           ENUMERATED {n1, n2}     OPTIONAL,   -- Need R
                    aggregationLevel2                           ENUMERATED {n1, n2}     OPTIONAL,   -- NeedR
                    aggregationLevel4                           ENUMERATED {n1, n2}     OPTIONAL,   -- Need R
                    aggregationLevel8                           ENUMERATED {n1, n2}     OPTIONAL,   -- Need R
                    aggregationLevel16                          ENUMERATED {n1, n2}     OPTIONAL    -- Need R },
                ...
            }                                           OPTIONAL,   -- Need R
            dci-Format2-1                               SEQUENCE {
            ...
            }                                           OPTIONAL,   -- NeedR
            dci-Format2-2                               SEQUENCE {
            ...
            }                                           OPTIONAL,   -- NeedR
            dci-Format2-3                               SEQUENCE{
                dummy1                                      ENUMERATED {sl1, sl2, sl4, sl5, sl8, sl10, sl16, sl20}   OPTIONAL,
-- Cond Setup
                dummy2                                      ENUMERATED {n1, n2},
                ...
            }                                           OPTIONAL    -- Need R
        },
        ue-Specific                                 SEQUENCE {
            dci-Formats                                 ENUMERATED {formats0-0-And-1-0, formats0-1-And-1-1},
            ...
        }
    }                                           OPTIONAL    -- Cond Setup
}
-- TAG-SEARCHSPACE-STOP
-- ASN1STOP
```

In the table, 'duration' is the number of consecutive slots of the search space that are lasted at every occasion given by periodicity and offset (Number of consecutive slots that a SearchSpace lasts in every occasion, i.e., upon every period as given in the periodicityAndOffset).

'monitoringSlotPeriodicityAndOffset' indicates slots for PDCCH monitoring composed of periodicity and offset. When the UE is configured to monitor DCI format 2_1, only the values 'sl1', 'sl2' or 'sl4' may be applicable. When the UE is configured to monitor DCI format 2_0, only the values 'sl1', 'sl2', 'sl4', 'sl5', 'sl8', 'sl10', 'sl16' and 'sl20' may be applicable.

'monitoringSymbolsWithinSlot' indicates the first symbol(s) for PDCCH monitoring in the slots configured for PDCCH monitoring (see monitoringSlotPeriodicityAndOffset and duration). The most significant (left) bit represents the first OFDM in a slot, and the second most significant (left) bit represents the second OFDM symbol in a slot and so on. The bit(s) set to one identify the first OFDM symbol(s) of the control resource set within a slot. If the cyclic prefix of the BWP is set to extended CP, the last two bits within the bit string shall be ignored by the UE. For DCI format 2_0, the first one symbol applies if the duration of CORESET identified by controlResourceSetId indicates 3 symbols, the first two symbols apply if the duration of CORESET identified by controlResourceSetId indicates 2 symbols, and the first three symbols apply if the duration of CORESET identified by controlResourceSetId indicates 1 symbol.

'nrofCandidates-SFI' indicates the number of PDCCH candidates for DCI format 2-0 for the configured aggregation level. If an aggregation level is absent, the UE does not search for any candidates with that aggregation level. The network configures only one aggregationLevel and the corresponding number of candidates.

'nrofCandidates' indicates the number of PDCCH candidates per aggregation level. The number of candidates and aggregation levels configured here applies to all formats unless a particular value is specified or a format-specific value is provided.

As described above, 'monitoringSlotPeriodicityAndOffset' of Table 6 may inform slots for PDCCH monitoring based on periodicity and offset. And it can be said that these slots correspond to an occasion for PDCCH monitoring. Also, 'duration' indicates consecutive slots in which the search space lasts at each occasion. In FIGS. 26, 261 and 262 can be referred to as PDCCH monitoring occasion configured by 'monitoringSlotPeriodicityAndOffset', and the search space lasts in three consecutive slots in each PDCCH monitoring occasion.

Meanwhile, among the PDCCH monitoring occasions configured as described above, the PDCCH monitoring occasion capable of monitoring the WUS may be limited to being within the interval (let's call this the WUS monitoring window) between the start slot of the DRX on duration (that is, a slot where drx-onDurationTimer starts, 263) and the time (264) indicated by the offset (PS-offset) value. That is, in FIG. 26, 261 is outside the WUS monitoring window, and 262 is within the WUS monitoring window. Accordingly, the UE may perform PDCCH monitoring for WUS detection only at the PDCCH monitoring occasion corresponding to 262.

When the UE detects WUS within the WUS monitoring window, it may perform a necessary operation in the DRX on duration based on the WUS. For example, if the WUS instructs the UE to wake up, PDCCH monitoring for detecting a general DCI format other than the WUS may be performed by waking up in the DRX on duration (i.e. it can also be expressed that the UE starts the drx-onDuration-Timer for the next DRX cycle).

Hereinafter, a method for a fallback operation of a UE when a wake up signal (WUS) is not detected and an apparatus using the method are proposed.

As described above, the WUS may be defined in a manner of indicating whether to perform PDCCH monitoring in the DRX on duration in connection with the DRX operation. In addition, a new DCI for WUS (WUS DCI) is being considered, and channel setting for smoothly performing WUS operation through the new DCI is required. Accordingly, the present disclosure proposes a control channel setting for WUS DCI transmission/reception and a fallback operation for a case where WUS DCI transmission/reception is not smooth. In the present disclosure, the term WUS may refer to a PDCCH-based power saving signal/channel under discussion in 3GPP standardization. For example, the WUS may be a DCI format 2_6, which is a downlink control information (DCI) format used to inform one or more UEs of power saving information. The DCI format 2_6 may include a wake-up indication (1 bit), a secondary cell dormancy indication, and the like and a cyclic redundancy check (CRC) may be scrambled by the PS-RNTI. DCI format 2_6 may be referred to as WUS DCI.

<Network Settings for WUS DCI Transmission/Reception>

The setting items for WUS transmission and reception are proposed below. All or part of the following items may be used for WUS DCI transmission/reception, and all or part of the contents of each item may be included in the WUS setting.

A field indication for each UE will be described.

The WUS may be divided into a UE-specific WUS and a group-specific WUS according to the number of UEs receiving a corresponding signal. In the case of group-specific WUS, a method of instructing the entire UE group to wake up and a method of instructing only a part of the UE group to wake up may be considered. In the case of group-specific WUS, since a WUS operation for a plurality of UEs can be performed with one DCI, it can be effective in terms of resource utilization.

On the other hand, it may not be suitable from a power saving point of view to classify WUS DCI transmission and reception, which is introduced for the purpose of power saving, in a UE-specific/group-specific manner, etc., so that each UE performs different operations in each method. Therefore, in the present disclosure, the network performs a UE-specific/group-specific WUS operation, but it is proposed that each method be applied in a transparent manner. To this end, the network indicates the UE with a DCI size, a starting position and length of information on the corresponding UE within DCI information bits, some or all of a power saving scheme included in the UE information. In this case, the UE can use only the area (information) allocated to itself among the decoded DCI information, and the network may operate by allocating the entire corresponding DCI to one UE or allocating the corresponding DCI to a plurality of UEs as needed.

The power saving scheme and related settings included in the UE information may be indicated in the following way.

Option 1) Implicit Indication

A type of power saving scheme and a bit length of each scheme may be defined for each UE information field length by predefined definition or network configuration. For example, when the network allocates only 1 bit to a specific UE, the corresponding field (by pre-defined or network configuration) may mean the presence or absence of wakeup in the associated on duration(s). When 3 bits are allocated (by predefined or network setting), the first 1 bit may mean a wake-up, and the remaining 2 bits may mean a minimum K0/K2 value in the on duration. Here, the minimum K0 may mean a slot offset (minimum value of the slot offset) between the PDCCH and the PDSCH scheduled by the PDCCH.

Option 2) Explicit Indication

The network may inform each UE of the power saving scheme included in the WUS DCI and field information for each scheme (through WUS DCI-related settings, etc.).

Additionally, when indicating a UE-specific field in DCI to each UE, the network may insert a known bit into an area not allocated to any UE, and inform the UE(s) receiving the DCI of the corresponding information (using higher layer signaling, etc.). The UE may improve decoding performance by using the corresponding information in the decoding process. For example, the network may insert 0 or 1 into bits remaining after setting the bit field for each UE belonging to the UE group, and notify the corresponding information to each UE belonging to the UE group.

A method of distinguishing between group-specific WUS DCI and UE-specific WUS DCI will be described.

In the above, a method of transparently operating group-specific/UE-specific WUS DCI to the UE was proposed, but it is also possible to operate by distinguishing the group-specific DCI from the UE-specific DCI as follows.

The network may configure a common search space (CSS) and a UE-specific search space (USS) to the UE for WUS DCI monitoring. It may be predefined or instructed by the network to monitor the group-specific WUS DCI scrambling by PS-RNTI in the CSS and the UE-specific WUS DCI scrambled by the C-RNTI in the USS. In this case, by reducing the amount of information for each UE in CSS, information on as many UEs as possible can be configured to be included in one DCI, and in the USS, more power saving schemes and information can be included in DCI to induce active power saving of the corresponding UE.

It may be instructed to monitor both the group-specific WUS DCI and the UE-specific WUS DCI in one search space (e.g., CSS) without distinction between CSS and USS. For this, the network sets the same DCI size of the group-specific WUS DCI and the UE-specific WUS DCI, and group-specific WUS DCI and UE-specific WUS DCI can be distinguished by PS-RNTI and C-RNTI. As above, field configuration information of DCI for each of the group-specific WUS DCI and the UE-specific WUS DCI may be indicated to each UE by the network. When monitoring group-specific WUS DCI and UE-specific WUS DCI simultaneously in the same search space set, decoding may be performed by classifying the type of the power saving scheme and field length indicated in the DCI by the RNTI.

Hereinafter, a bandwidth part (BWP) for WUS monitoring will be described.

In the NR system, a plurality of BWPs (up to four) may exist in each serving cell. The currently operating BWP is called an active BWP, and the BWP to which the UE moves when the BWP inactivity timer expires is called the default BWP, and the BWP operated in the initial access process can be defined as an initial BWP.

In order to define WUS monitoring performed during DRX operation, the BWP for performing WUS monitoring has to be determined first. In the present disclosure, it is possible to determine the BWP on which WUS monitoring is performed in the following way. One of the methods below may be defined as the WUS monitoring BWP, or one of the methods below may be indicated by the network as the WUS monitoring BWP determination method.

Option 1) Default BWP

According to option 1, WUS monitoring during DRX operation may be performed in the default BWP. Then, there is no need to set a CORESET/search space set for WUS monitoring for each BWP, and there is an advantage in that ambiguity that may occur during frequent BWP movement (e.g., when a network and a UE recognizes different BWPs as WUS monitoring BWPs) can be reduced. In addition, the network may set a small (small) bandwidth (BW) and/or small CORESET to the default BWP in order to reduce power consumption of the WUS detection process. If WUS is detected in the default BWP, it is possible to monitor the CORESET/search space set configured in the default BWP (for PDCCH monitoring) in the DRX on duration associated with the WUS, and the UE can move to a BWP suitable for data transmission/reception using the existing BWP switching mechanism.

When option 1 is applied, if the existing BWP inactivity timer is not reset at the time of WUS monitoring, ambiguity may occur at the time of WUS monitoring or after WUS detection. For example, when the WUS is detected in the default BWP and the BWP activation timer expires after moving from the default BWP to another BWP, there may be a case where it is necessary to move to the default BWP again. Therefore, when detecting WUS in the default BWP or moving to the default BWP for WUS monitoring, it is desirable to reset the BWP inactivity timer. This can be applied to cases other than option 1, and in general, it may be interpreted that the existing BWP inactivity timer is reset when WUS monitoring is performed or WUS is detected. Alternatively, it may be interpreted that the WUS DCI is regarded as the same as the general PDCCH in the active time.

Option 2) WUS Monitoring BWP Configured by Network.

According to option 2, WUS monitoring during DRX operation may be performed in the WUS monitoring BWP configured by the network. Option 2 may be viewed as a method in which the role of the default BWP in option 1 is performed by a specific BWP designated by the network among BWPs separately set by the network for WUS monitoring or BWPs set to the corresponding UE. Except for separately designating the BWP by the network, the same operation as in option 1 may be performed.

Option 3) Active BWP in WUS Monitoring Occasion.

According to option 3, WUS monitoring during DRX operation may be performed at the active BWP in the WUS monitoring occasion. Option 3 means that the active BWP at the time of WUS monitoring is considered as the WUS monitoring BWP. In other words, in a situation where the BWP other than the default BWP is the active BWP (from the viewpoint of DRX operation), if WUS monitoring should be performed at the point in time when the inactivity timer is not terminated, the corresponding active BWP may act as a WUS monitoring BWP. To this end, the network may set a resource (e.g., CORESET(s)/search space set(s)) for WUS monitoring for each BWP.

In addition, when it is difficult to predict the traffic pattern of the UE, it may not be suitable to apply the power saving scheme only in the time domain. Therefore, the present disclosure proposes not to apply the power saving scheme of WUS monitoring in a specific BWP, which can be implemented through WUS monitoring resource setting. For example, in order to adjust WUS operation without additional signaling, the network may not configure WUS monitoring resources (e.g., CORESET(s)/search space set(s)) in a specific BWP. If the WUS monitoring resource is not set in the active BWP at the time of WUS monitoring, the UE may perform PDCCH monitoring (based on the CORESET/search space set configured in the BWP) based on the existing DRX operation in the corresponding BWP. This may mean that the network can set whether to apply the WUS-based power saving scheme by changing the BWP.

Hereinafter, a CORESET for WUS monitoring will be described.

In the NR system, the CORESET serves to set resource information (frequency domain resource allocation, CORESET duration, REG-to-CCE mapping type, REB bundle size, etc.) for a hashing function, that is, a function for determining a candidate for which the UE should perform blind decoding, of a control channel. WUS DCI can also be transmitted and received through the same process as a general PDCCH. Therefore, a CORESET for monitoring WUS DCI should be set, and the present disclosure proposes the following method.

The network may instruct one or more CORESETs for WUS monitoring, and each CORESET setting may be instructed in the following manner. The network may indicate the WUS monitoring CORESET by using some or all of the following methods.

Regarding the existing PDCCH CORESET, only a maximum of three CORESETs per BWP could be configured. This has the purpose of limiting operations (e.g., measurement, tracking, etc.) required for the UE to maintain each CORESET when the number of CORESETs increases. On the other hand, in the case of WUS monitoring, since it is distinguished from general PDCCH monitoring in the time domain, it may not be desirable to apply the same restriction as that of the general CORESET. Therefore, it is desirable to apply a separate restriction from the CORESET for general PDCCH monitoring for the WUS monitoring CORESET. That is, a limit (e.g., 2, 3) for the maximum number of WUS monitoring CORESETs that can be designated for each BWP may be defined. Also, this may mean that the WUS CORESET is not monitored in a duration in which the CORESET for general PDCCH monitoring is monitored (e.g., active time in DRX operation).

Option 1) Option to Separately Set the CORESET for WUS Monitoring.

Option 1 means that the CORESET for WUS monitoring is set to be the same as the CORESET for existing PDCCH monitoring.

Option 2) Option to Separately Set the CORESET for WUS Monitoring and Link the TCI.

Option 1 may be inefficient from a beam management point of view. In general, the TCI of the WUS monitoring CORESET can be set similarly to the TCI of the CORESET(s) set in the WUS monitoring BWP. This may mean that when the TCI of the PDCCH monitoring CORESET is changed according to the beam management result in the active time, etc., the TCI of the WUS monitoring CORESET should also be changed. If TCI update occurs frequently within the active time, it may mean that unnecessary (WUS CORESET TCI) reconfiguration should be performed. In order to overcome this drawback, the present disclosure proposes that the TCI of the WUS monitoring CORESET is linked to the TCI of the PDCCH monitoring CORESET configured in the corresponding BWP. The linkage method may be considered as follows.

Alt 1) Explicit TCI determination: The network can configure the TCI of each WUS monitoring CORESET to follow the TCI of which PDCCH monitoring CORESET.

Alt 2) Implicit TCI determination: A rule for determining the PDCCH monitoring CORESET to which the TCI of the WUS monitoring CORESET is to be linked may be applied by a predefined definition or by a network instruction. For example, it can be defined in advance that the WUS monitoring CORESET follows the TCI of the CORESET monitored at the closest time among the CORESETs monitored in the associated (DRX) on duration. As another example, the TCI of the CORESET with the lowest (or highest) CORESET ID (or the search space set ID linked to the CORESET) among the CORESETs monitored in the linked on duration can be recognized as the TCI of the WUS monitoring CORESET. Similarly, among the CORESETs monitored in the linked on duration, the TCI of the CORESET linked to CSS (or, if there are multiple CSSs, the CORESET linked to the CSS of the lowest ID, or the CORESET having a lowest CORESET ID among CORESETs linked to CSS) may be regarded as the TCI of the WUS monitoring CORESET. When such Alt 2 is applied, since the TCI of the WUS monitoring CORESET can be adapted to the TCI change of the PDCCH monitoring CORESET without additional signaling, signaling overhead can be reduced. In addition, by applying the TCI applied to the active time, more accurate WUS transmission/reception can be expected by the TCI.

Option 3) Option to Select Among CORESETs for PDCCH Monitoring.

The network may instruct one or more of the CORESETs configured for PDCCH monitoring to be also used as the WUS monitoring CORESET.

Beam management in the DRX OFF duration will be described.

When the DRX operation and WUS DCI monitoring indicating whether to monitor the PDCCH are set together, the length of the period in which the UE does not perform PDCCH monitoring may be significantly increased compared to the existing DRX operation. In this case, maintaining the (beam-related, cell-related) measurement and report indicated in the existing DRX operation in the corresponding duration may be inappropriate in terms of power saving or beam management. For example, when a measurement report is frequently set, it may be desirable for a UE that does not monitor PDCCH in multiple DRX cycles to reduce power consumption due to a report, and it may be effective for link and beam management to set a measurement period and a report period for appropriate beam management based on a traffic pattern of the UE.

To solve this problem, in the present disclosure, when DRX operation is set and/or when DRX operation and WUS DCI monitoring are set at the same time, it is proposed to separately set the measurement report setting in the DRX off duration. At the active time, the UE performs a measurement report according to the measurement report setting at the active time, and in a duration other than the active time, a measurement report can be performed according to a separately configured measurement report setting of the DRX off duration. Separately from the above, the UE may request the network to stop the DRX operation and/or the WUS DCI monitoring operation. In general, PDCCH monitoring is not performed in the DRX off duration (that is, in the duration excluding the active time in the DRX operation), and this means that operations such as beam change and CORESET/search space set reset by the network cannot be performed during the DRX off duration. In this case, when the DRX cycle is large, unnecessary operations such as beam failure may be performed. Therefore, the UE requests the network to stop the DRX operation and/or the WUS DCI monitoring operation, and the UE receiving the request may perform beam management for the UE and reconfiguration of the data/control channel.

<Fallback Operation>

If blind decoding for WUS DCI is performed at the WUS monitoring occasion indicated by the network but WUS is not detected, The UE cannot distinguish i) whether the WUS detection failure occurred because the network did not transmit the WUS DCI, or ii) whether the network transmitted the WUS DCI but failed to decode due to the channel environment, etc. In particular, when the network transmits WUS DCI but the UE fails to decode, side effects such as throughput loss and latency increase may occur according to subsequent operations of the corresponding UE. In order to solve this problem, the present disclosure proposes an operation of the UE when the UE fails to detect WUS in the WUS monitoring occasion.

Type A fallback operation: this is an operation of performing PDCCH monitoring in the on duration associated with the corresponding WUS monitoring occasion.

The PDCCH monitoring performed by the Type A fallback operation is performed in all CORESETs/search space sets configured for the corresponding on duration, or a specified CORESET/search space set (e.g., CSS, search space for monitoring fallback DCI, etc.). This may be determined by a predefined definition, or a CORESET(s)/search space set(s) to be monitored in a type A fallback operation may be indicated by network configuration.

Type B fallback operation: PDCCH monitoring is not performed in the on duration associated with the corresponding WUS monitoring occasion.

Figure 27:
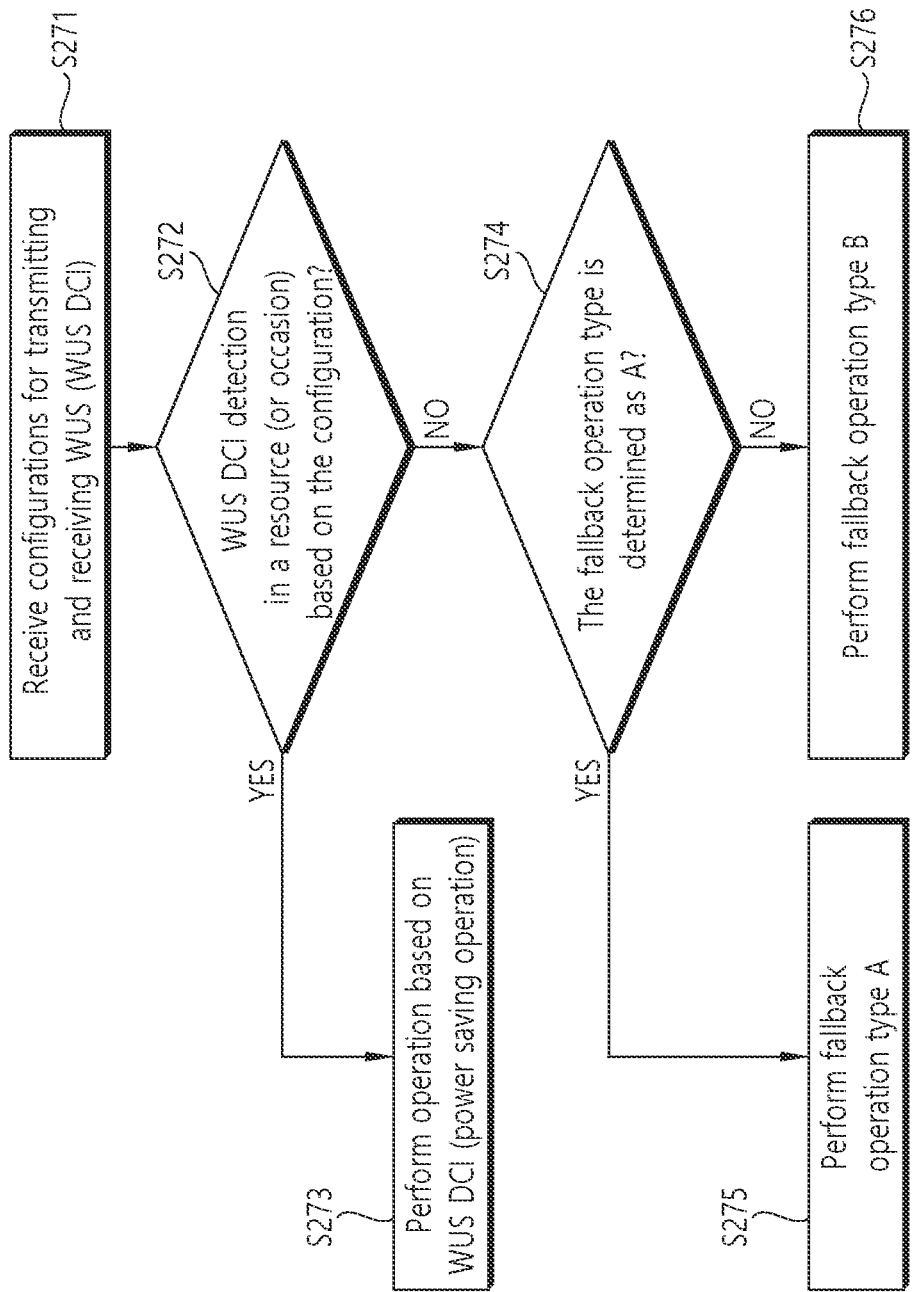
FIG. 27 illustrates an operation of a UE according to an embodiment of the present disclosure.

FIG. 27 illustrates an operation of a UE according to an embodiment of the present disclosure.

Referring to FIG. 27, the UE may receive a configuration for WUS (WUS DCI) transmission/reception from the network (S271). The UE attempts to detect WUS DCI in the resource (occasion) based on the configuration (S272). If the WUS DCI is detected from the resource (occasion), the UE performs an operation (power saving operation) based on the WUS DCI (S273). If the WUS DCI is not detected in the resource (occasion), the UE determines whether to operate in the aforementioned fallback operation type A (S274). According to the determination, the fallback operation type A is performed (S275) or the fallback operation type B is performed (S276). As will be described later, the network may configure which type of fallback operation to be performed by the UE.

Each step of FIG. 27 may refer to the following description. However, FIG. 27 is only an embodiment of the UE operation and is not necessarily limited thereto. A setting for WUS (WUS DCI) transmission and reception may be provided, for example, by a higher layer signal (e.g., an RRC signal).

A method of applying the fallback operation will be described.

The fallback operation suggested above can be applied in the following way. The methods below may be applied alone or in combination. In addition, the fact that WUS DCI is not detected in the monitoring occasion below may mean that DCI is not detected in the WUS monitoring occasion (s) set to indicate the wake-up of a specific DRX cycle (s), and this may mean that WUS is not detected in one or more monitoring occasions set for one DRX cycle (or one DRX cycle set).

Option 1) Determination of Type by Network Configuration.

The network may instruct the UE to apply a specific type of fallback operation (based on a traffic pattern of the corresponding UE, traffic conditions within coverage, etc.). For example, when traffic to a plurality of UEs is large within the coverage of the corresponding network, the UE may instruct the corresponding UE to perform a Type B fallback operation, and may take actions such as not performing WUS transmission. On the other hand, when the traffic of the corresponding UE is large, the type A fallback operation may be instructed to reduce the latency and respond to a missing case of WUS DCI. That is, the network may instruct the UE which fallback operation to perform.

Option 2) Determination of Type by DRX Cycle/WUS Monitoring Cycle.

The fallback operation type may be implicitly determined by the DRX cycle of each UE, the WUS monitoring duration (periodicity), the WUS configuration, and the like. For example, when the DRX cycle of the UE is smaller (than X ms), it may be preferable to apply the Type B fallback operation because the duration until the next DRX cycle is short. Similarly, when the monitoring periodicity for WUS DCI is short, the type B fallback operation may be applied. As another example, a fallback operation type may be determined according to the number of DRX cycles associated with one WUS monitoring occasion. As an example, when only one DRX cycle is associated with one WUS monitoring occasion, the UE performs a type B fallback operation, and when a plurality of DRX cycles are associated with one WUS monitoring occasion, a Type A fallback operation may be performed. In the latter case, it may be defined that the fallback operation is performed only in specific DRX cycle(s) among a plurality of DRX cycles.

Specific examples of applying the fallback operation will be described.

The fallback operation proposed above may be applied to the following cases, and the applied fallback operation type may be indicated by the type determination method proposed above.

Case 1) WUS DCI is not Detected in WUS Monitoring Occasion.

As stated above, when a WUS is not detected in blind decoding for a specific WUS monitoring occasion, a fallback operation may be applied.

Figure 28:
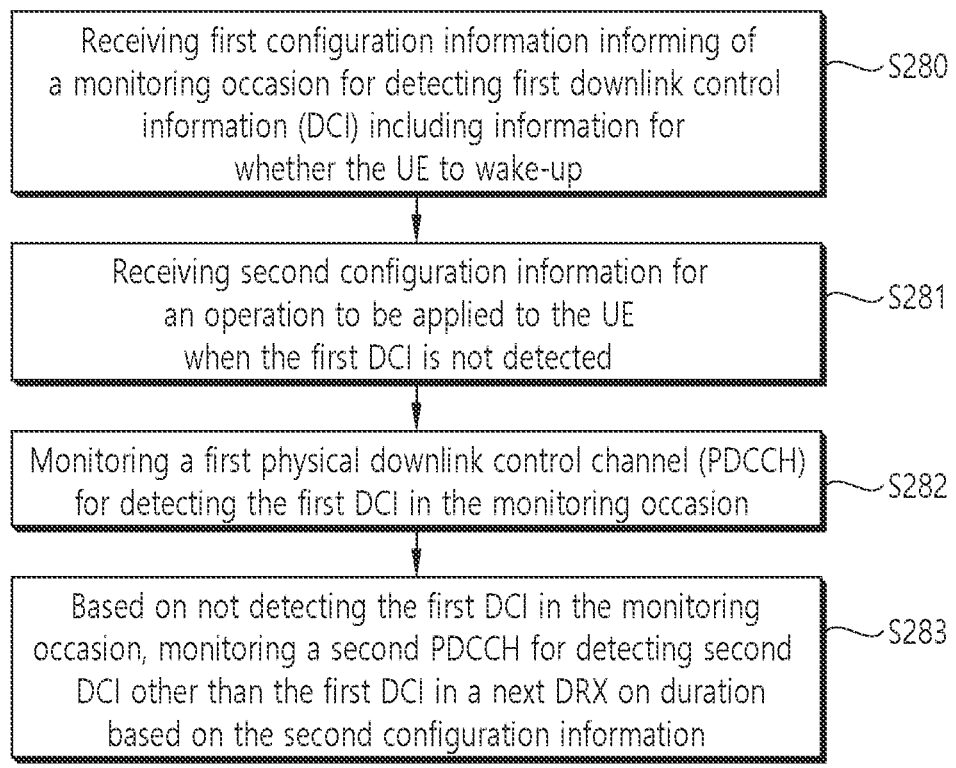
FIG. 28 illustrates a PDCCH monitoring method of a UE.

FIG. 28 illustrates a PDCCH monitoring method of a UE.

Referring to FIG. 28, the UE receives, from a base station, first configuration information informing of a monitoring occasion for detecting first downlink control information (DCI) including information for whether the UE to wake-up (S280).

The first configuration information may inform at least one or more of the monitoring occasions. The first configuration information may be a message for setting the search space (set) of Table 6 described above.

The UE receives, from the base station, second configuration information instructing an operation to be applied to the UE when the first DCI is not detected (S281).

The following table is an example of a higher layer message including the second configuration information.

TABLE 7

```
DCP-Config-r16 ::=              SEQUENCE {
    ps-RNTI-r16                     RNTI-Value,
    ps-Offset-r16                   INTEGER (1..120),
    sizeDCI-2-6-r16                 INTEGER (1..maxDCI-2-6-Size-r16),
    ps-PositionDCI-2-6-r16          INTEGER (0..maxDCI-2-6-Size-1-r16),
    ps-WakeUp-r16                       ENUMERATED {true}      OPTIONAL,  -- Need S
    ps-TransmitPeriodicL1-RSRP-r16      ENUMERATED {true}      OPTIONAL,  -- Need S
    ps-TransmitOtherPeriodicCSI-r16     ENUMERATED {true}      OPTIONAL   -- Need S
}
```

In the table above, DCP means DCI scrambled CRC by PS-RNTI, and DCI format 2_6 described above may correspond to this. 'ps-RNTI' indicates an RNTI value for scrambling CRC of DCI format 2_6, and 'ps-Offset' indicates an offset value related to the start of a search time of DCI format 2_6. 'sizeDCI-2-6' informs the size of DCI format 2_6, and 'ps-PositionDCI-2-6' informs the starting position of UE wakeup indication in DCI format 2_6. 'ps-WakeUp' indicates the UE to wake up if DCI format 2_6 is not detected. If the field is absent, the UE does not wake-up if DCI format 2-6 is not detected. 'ps-WakeUp' may correspond to the above-described second configuration information.

That is, the 'operation to be applied to the UE when a first DCI is not detected' indicated by the second configuration information may indicate that the UE is to wake up. Here, instructing the UE to wake up may be equivalent to instructing the UE to start drx-onDurationTimer or to perform PDCCH monitoring in the next DRX on duration. That is, the second configuration information may indicate the aforementioned type A fallback operation.

The first configuration information and/or the second configuration information may be provided to the UE through a higher layer signal such as a radio resource control (RRC) message rather than a physical layer signal such as WUS DCI. Through this, higher reliability can be secured. Also, although not essential, the UE may transmit ACK/NACK for the first configuration information and/or the second configuration information. Through these methods, it is possible to prevent from occurring misunderstandings about the first and second configuration information between the UE and the network (base station), and to secure higher reliability.

The UE monitors a first PDCCH to detect the first DCI in the monitoring occasion (S282).

Based on not detecting the first DCI in the monitoring occasion, the UE monitors a second PDCCH for detecting second DCI other than the first DCI in a next discontinuous reception (DRX) on duration based on the second configuration information (S283). That is, when the UE does not detect the first DCI at the monitoring occasion, whether to perform the second PDCCH monitoring to detect a general DCI (e.g., DCI format 0, 1, etc.) in the next DRX on duration is determined according to the second configuration information.

In other words, even if WUS (i.e., first DCI) is not detected at the WUS monitoring occasion, since it has been previously configured to monitor (wake up) the PDCCH in the next DRX on duration by the highly reliable second configuration information, the UE monitors the PDCCH in the next DRX on duration. From the base station's point of view, if the second configuration information is transmitted to a specific UE (group), it can be known in advance that PDCCH monitoring will be performed in the next DRX on duration regardless of whether the specific UE (group) has properly detected WUS in the WUS monitoring occasion for the specific UE (group). Therefore, if necessary, the PDCCH for the specific UE (group) may be transmitted in the next DRX on duration. Through this, effects such as an increase in throughput, a decrease in delay, and improvement of communication reliability are shown.

The first DCI may be a DCI format 2_6 including a wake-up indication, and the PDCCH monitoring performed in the next DRX on duration may be to detect a second DCI (general DCI formats such as DCI formats 0 and 1 for scheduling information or DCI formats for other purposes such as power control) other than the first DCI.

Figure 29:
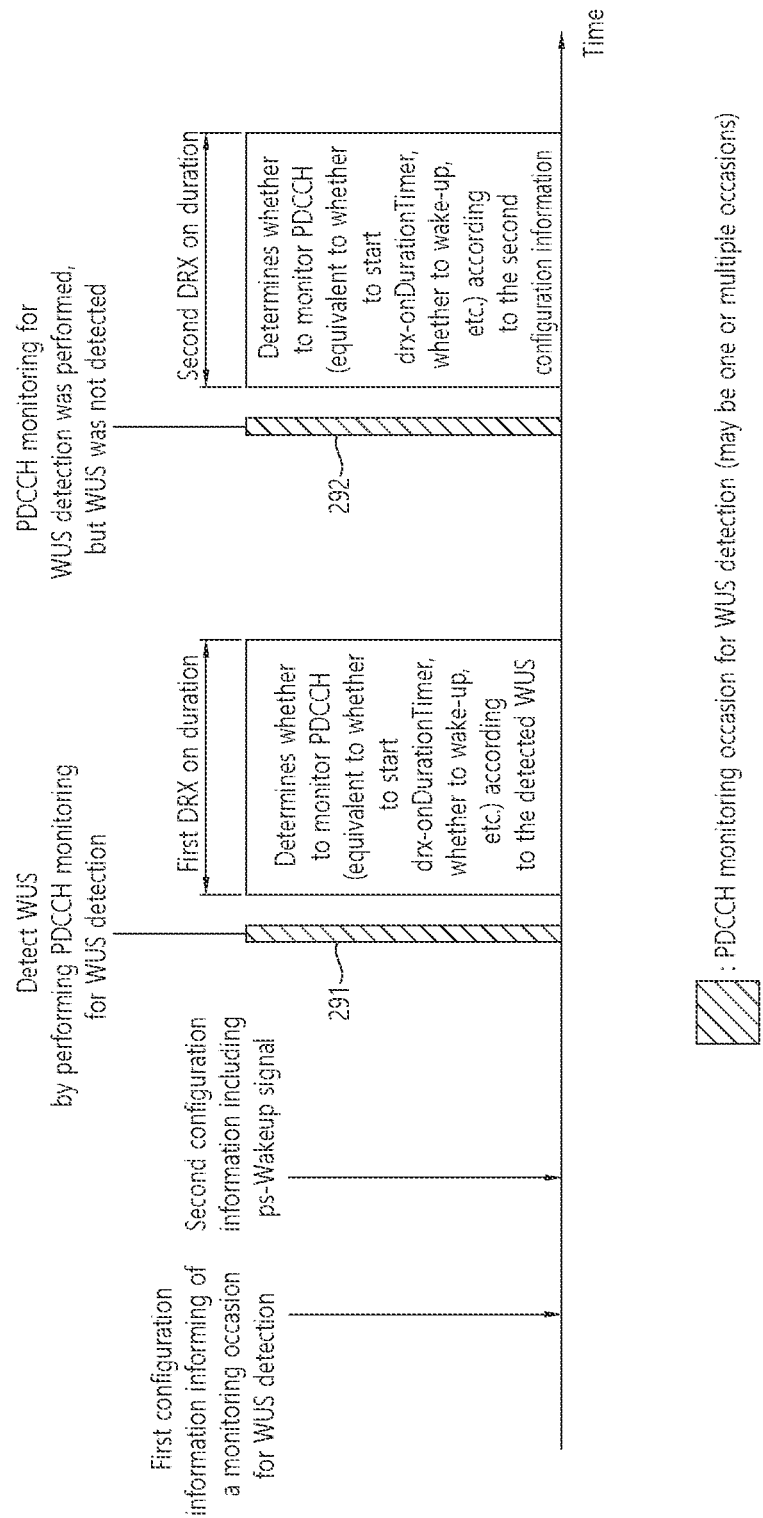
FIG. 29 shows a specific example of applying the method of FIG. 28.

FIG. 29 shows a specific example of applying the method of FIG. 28.

Referring to FIG. 29, the UE receives first configuration information informing of a monitoring occasion for WUS (the above-described first DCI, hereinafter the same) detection. Thereafter, the second configuration information including the aforementioned 'ps-WakeUP' (information informing whether the UE to wake-up) is received. Here, the first configuration information and the second configuration information may be separately provided or may be provided simultaneously through one message. In addition, the order of receiving the first configuration information and the second configuration information is only an example and not a limitation. For example, the second configuration information may be received before the first configuration information.

The UE may detect WUS by performing PDCCH monitoring for WUS detection at the monitoring occasion 291 set by the first configuration information. In this case, based on the WUS, it may be determined whether to monitor the PDCCH in the next DRX on duration (let's call this a first DRX on duration) associated with the monitoring occasion 291.

On the other hand, although the UE performs PDCCH monitoring for WUS detection at the monitoring occasion 292 set by the first configuration information, WUS (first DCI) may not be detected. In this case, it is possible to determine whether to monitor the PDCCH in the next DRX on duration (let's call this a second DRX on duration) associated with the monitoring occasion 292 according to the second configuration information. More specifically, the UE may perform PDCCH monitoring (waking up) in the second DRX on duration according to the second configuration information. If, in a situation where the second configuration information is not received, PDCCH monitoring for WUS detection is performed at the monitoring occasion 292, but WUS is not detected, then The UE may not perform PDCCH monitoring (without waking up as a result) in the second DRX on duration.

Figure 30:
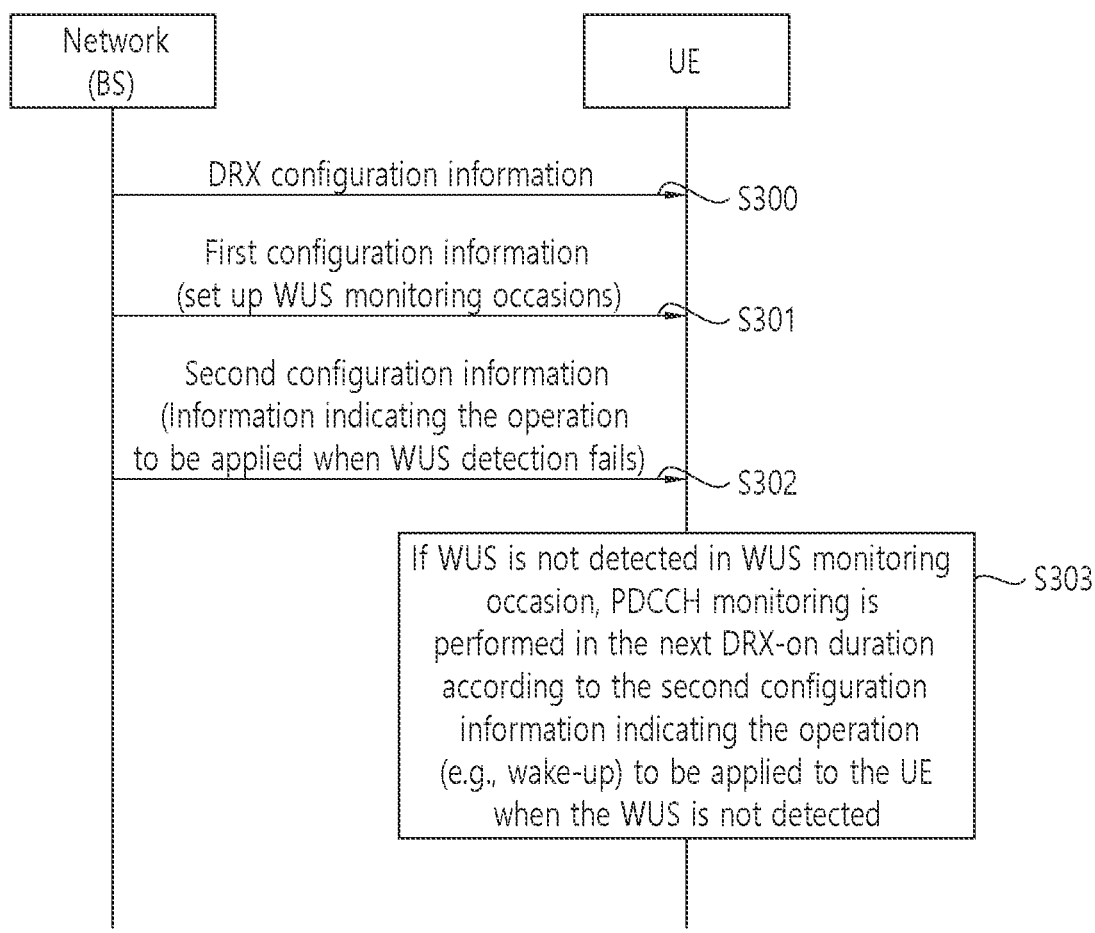
FIG. 30 illustrates a signaling process between a network and a UE.

FIG. 30 illustrates a signaling process between a network and a UE.

Referring to FIG. 30, the network (base station) may provide DRX configuration information to the UE (S300).

The following table illustrates DRX configuration information.

TABLE 8

```
DRX-Config ::=                          SEQUENCE{
    drx-onDmationTimer                  CHOICE {
                        subMilliSeconds INTEGER (1..31),
                        milliseconds    ENUMERATED {
            ms1, ms2, ms3, ms4, ms5, ms6, ms8, ms10, ms20, ms30, ms40, ms50, ms60,
            ms80, ms100, ms200, ms300, ms400, ms500, ms600, ms800, ms1000, ms1200,
            ms1600, spare8, spare7, spare6, spare5, spare4, spare3, spare2, spare1 }
                        },
    drx-InactivityTimer                 ENUMERATED {
        ms0, ms1, ms2, ms3, ms4, ms5, ms6, ms8, ms10, ms20, ms30, ms40, ms50, ms60, ms80,
        ms100, ms200, ms300, ms500, ms750, ms1280, ms1920, ms2560, spare9, spare8,
        spare7, spare6, spare5, spare4, spare3, spare2, spare1},
    drx-HARQ-RTT-TimerDL                INTEGER (0..56),
    drx-HARQ-RTT-TimerUL                INTEGER (0..56),
    drx-RetransmissionTimerDL           ENUMERATED {
            sl0, sl1, sl2, sl4, sl6, sl8, sl16, sl24, sl33, sl40, sl64, sl80, sl96, sl112, sl128,
            sl160, sl320, spare15, spare14, spare13, spare12, spare11, spare10, spare9,
            spare8, spare7, spare6, spare5, spare4, spare3, spare2, spare1},
    drx-RetransmissionTimerUL           ENUMERATED {
            sl0, sl1, sl2, sl4, sl6, sl8, sl16, sl24, sl33, sl40, sl64, sl80, sl96, sl112, sl128,
            sl160, sl320, spare15, spare14, spare13, spare12, spare11, spare10, spare9,
            spare8, spare7, spare6, spare5, spare4, spare3, spare2, spare1 },
    drx-LongCycle StartOffset           CHOICE {
        ms10                                INTEGER(0..9),
        ms20                                INTEGER(0..19),
        ms32                                INTEGER(0..31),
        ms40                                INTEGER(0..39),
        ms60                                INTEGER(0..59),
        ms64                                INTEGER(0..63),
        ms70                                INTEGER(0..69),
        ms80                                INTEGER(0..79),
        ms128                               INTEGER(0..127),
        ms160                               INTEGER(0..159),
        ms256                               INTEGER(0..255),
        ms320                               INTEGER(0..319),
        ms512                               INTEGER(0..511),
        ms640                               INTEGER(0..639),
        ms1024                              INTEGER(0..1023),
        ms1280                              INTEGER(0..1279),
        ms2048                              INTEGER(0..2047),
        ms2560                              INTEGER(0..2559),
        ms5120                              INTEGER(0..5119),
        ms10240                             INTEGER(0..10239)
    },
    shortDRX                            SEQUENCE {
        drx-ShortCycle                      ENUMERATED {
            ms2, ms3, ms4, ms5, ms6, ms7, ms8, ms10, ms14, ms16, ms20, ms30, ms32,
            ms35, ms40, ms64, ms80, ms128, ms160, ms256, ms320, ms512, ms640, spare9,
            spare8, spare7, spare6, spare5, spare4, spare3, spare2, spare1 },
        drx-ShortCycleTimer                 INTEGER (1..16)
    }
OPTIONAL,   -- Need R
    drx-SlotOffset                      INTEGER (0..31)
}
```

The DRX configuration information may be used to set DRX related parameters.

'drx-HARQ-RTT-TimerDL' means value in number of symbols of the BWP where the transport block was received, and 'drx-HARQ-RTT-TimerUL' means value in number of symbols of the BWP where the transport block was transmitted. 'drx-InactivityTimer' is a Value in multiple integers of 1 ms, and ms0 corresponds to 0, ms1 corresponds to 1 ms, ms2 corresponds to 2 ms, and so on. 'drx-onDurationTimer' may be a value in multiples of $1/32$ ms or in ms. In addition, values of other DRX related parameters may be set. The DRX operation of the UE may be determined by these parameters.

The base station transmits first configuration information (S301) and transmits second configuration information (S302). The first and second configuration information is the same as previously described with reference to FIGS. 28 to 29.

From a UE point of view, when the UE fails to detect WUS at the (valid) WUS monitoring occasion, PDCCH monitoring is performed in the next DRX on duration according to second configuration information instructing the operation (e.g., wake-up) to be applied to the UE when the WUS is not detected (S303).

From a base station point of view, if the base station has transmitted the second configuration information to the UE (group), regardless of whether the WUS is transmitted in the WUS monitoring occasion (or after transmitting WUS (first DCI) in the WUS monitoring occasion), general DCI (second DCI) for the UE (group) can be transmitted in the next DRX on duration.

Through this method, regardless of whether the UE properly detects the WUS, both the UE and the base station can know that the UE will perform PDCCH monitoring for general DCI detection in the next DRX on duration associated with the WUS monitoring occasion. Accordingly, ambiguity does not occur between the UE and the base station, and unnecessary delay and throughput reduction do not occur.

Case 2) when WUS DCI is not Detected in a Certain Number of WUS Monitoring Occasions.

In the duration in which WUS monitoring is performed and in the DRX off duration, the UE can be guaranteed from the network that PDCCH monitoring is not required. This may mean that the UE cannot receive RRC signaling such as CORESET TCI change (when WUS DCI is not detected) in the corresponding section. This means that even if the TCI suitable for the corresponding UE is changed due to the mobility of the UE, the beam direction, etc., there is no method for the network to indicate the TCI change, etc., and this may result in beam failure, link failure, and the like. Therefore, when WUS DCI is not selected from the number of WUS monitoring occasions predefined or set by the network, it may be desirable to apply the fallback operation proposed above. The predefined number of WUS monitoring occasions may be defined as the maximum number of DRX cycles in which the network may not continuously transmit WUS under the assumption that the WUS operation is in progress.

In case 2, the WUS monitoring occasion means a WUS monitoring set indicating whether one DRX cycle or a DRX cycle set is woken up. And a WUS monitoring set may be configured as one WUS monitoring occasion, or may consist of multiple WUS monitoring occasions (to increase repetition or transmission opportunity).

The settings for the power saving scheme in the fallback operation will be described.

In the above, proposals for when the fallback operation is performed and what operation (e.g., whether to monitor the PDCCH) is performed in the fallback mode are described. Additionally, in the present disclosure, when a fallback operation is performed in a situation in which a power saving operation using cross slot scheduling, a maximum MIMO layer, or the like is set, operations of corresponding schemes are proposed.

In cross-slot scheduling, minimum applicable K0/K2, etc. may be indicated for the purpose of power saving. This is a method in which the network guarantees the minimum slot offset from the reception of the PDCCH to the scheduled PDSCH/PUSCH to the UE, and the UE receiving the corresponding value may reduce power consumption by performing a low voltage/low clock speed operation or a sleep operation during the guaranteed slot offset. When the minimum applicable K0/K2 is included in the WUS DCI, although the network indicates the minimum applicable K0/K2 through the WUS DCI, the UE may fail to detect the WUS DCI and thus cannot apply the corresponding value.

Among the methods proposed above, if a fallback operation for performing PDCCH monitoring when WUS DCI detection fails is applied, the minimum applicable K0/K2 to be applied in the corresponding fallback operation for the corresponding UE should be defined. The present disclosure proposes to assume that the minimum applicable K0/K2 is a specific value when a fallback operation is performed, and the specific value may be defined in the following way.

Option 1) Minimum Value in TDRA Table.

The UE may assume the minimum applicable K0/K2 in the fallback operation as the minimum value in the TDRA table to which the UE should apply. This may be interpreted as stopping power saving by cross-slot scheduling until a new minimum applicable K0/K2 is received in the fallback operation.

Option 2) Value Set by the Network.

The network may indicate in advance the minimum applicable K0/K2 value that should be assumed in the fallback operation by using higher layer signaling or the like. Alternatively, a minimum applicable K0/K2 value that should be assumed in the fallback operation may be defined in advance.

Option 3) the Most Recent Minimum Applicable K0/K2 Value.

The UE may assume the most recently received minimum applicable K0/K2 before the fallback operation during the fallback operation.

Similar to the above minimum applicable K0/K2, the WUS DCI may include a maximum number of layers. This may be used for the purpose of reducing power consumption by reducing the number of RX antennas to the UE. In this case, too, when WUS DCI is not detected, understanding of the network and the UE may be different, so it is necessary to define the maximum number of layers that can be assumed in the fallback operation. Accordingly, the present disclosure proposes to assume that the maximum number of layers is a specific value when a fallback operation is performed, and the specific value may be defined in the following way.

Option 1) the Largest Value Among the Maximum Number of Layers in Each of the Configured BWPs.

The UE may apply the largest value among the maximum number of layers designated for each configured BWP during the fallback operation.

Option 2) the Most Recent 'Maximum Number of Layers' of the Active BWP.

The UE may assume that the most recently received 'maximum number of layers' for the BWP in which the fallback operation is performed is the 'maximum number of layers' in the fallback operation.

Option 3) the Value Set by the Network.

The network may indicate in advance the value of the 'maximum number of layers' that should be assumed in the fallback operation by using higher layer signaling or the like. Alternatively, the 'maximum number of layers' value that should be assumed in the fallback operation may be defined in advance. In this case, the 'maximum number of layers' in the fallback operation may be defined for each BWP.

Meanwhile, NR supports a plurality of numerologies (or a plurality of ranges of subcarrier spacing (SCS)) in order to support a variety of 5G services. For example, when SCS is 15 kHz, a wide area in traditional cellular bands is supported; when SCS is 30 kHz/60 kHz, a dense-urban, lower-latency, and wider-carrier bandwidth is supported; when SCS is 60 kHz or higher, a bandwidth greater than 24.25 GHz is supported to overcome phase noise.

NR frequency bands may be defined as frequency ranges of two types (FR1 and FR2). The values of the frequency ranges may be changed. For example, the frequency ranges of the two types (FR1 and FR2) may be as shown in Table 9. For convenience of description, FR1 of the frequency ranges used for an NR system may refer to a "sub 6 GHz range", and FR2 may refer to an "above 6 GHz range" and may be referred to as a millimeter wave (mmW).

TABLE 9

| Frequency range designation | Corresponding frequency range | Subcarrier spacing |
|---|---|---|
| FR1 | 450 MHz-6000 MHz | 15, 30, 60 kHz |
| FR2 | 24250 MHz-52600 MHz | 60, 120, 240 kHz |

As illustrated above, the values of the frequency ranges for the NR system may be changed. For example, FR1 may include a band from 410 MHz to 7125 MHz as shown in Table 10. That is, FR1 may include a frequency band of 6 GHz (or 5850, 5900, 5925 MHz, or the like) or greater. For example, the frequency band of 6 GHz (or 5850, 5900, 5925 MHz, or the like) or greater included in FR1 may include an unlicensed band. The unlicensed bands may be used for a variety of purposes, for example, for vehicular communication (e.g., autonomous driving).

TABLE 10

| Frequency range designation | Corresponding frequency range | Subcarrier spacing |
|---|---|---|
| FR1 | 410 MHz-7125 MHz | 15, 30, 60 kHz |
| FR2 | 24250 MHz-52600 MHz | 60, 120, 240 kHz |

FIG. 31 illustrates a vehicle or an autonomous driving vehicle applied to this specification. The vehicle or the autonomous driving vehicle may be configured as a mobile robot, a car, a train, a manned/unmanned aerial vehicle (AV), a ship, or the like.

Referring to FIG. 31, the vehicle or the autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. Blocks 110/130/140a to 140d correspond to the blocks 110/130/140 in FIG. 28, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140a may enable the vehicle or the autonomous driving vehicle 100 to run on the ground. The driving unit 140a may include an engine, a motor, a power train, wheels, a brake, a steering device, and the like. The power supply unit 140b supplies power to the vehicle or the autonomous driving vehicle 100 and may include a wired/wireless charging circuit, a battery, and the like. The sensor unit 140c may obtain a vehicle condition, environmental information, user information, and the like. The sensor unit 140c may include an inertial measurement unit (IMU) sensor, a collision sensor, a wheel sensor, a speed sensor, an inclination sensor, a weight sensor, a heading sensor, a position module, vehicular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140d may generate an autonomous driving route and a driving plan on the basis of obtained data. The control unit 120 may control the driving unit 140a to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140c may obtain a vehicle condition and environmental information. The autonomous driving unit 140d may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method comprising:
receiving, from a base station, a first configuration message comprising first configuration information for a monitoring occasion for detecting first downlink control information (DCI) including information for whether a user equipment (UE) to wake-up;
receiving, from the base station, a second configuration message which can comprise second configuration information for an operation to be applied to the UE based on the first DCI not being detected; and
monitoring a first physical downlink control channel (PDCCH) for detecting the first DCI in the monitoring occasion,
wherein, (i) based on the second configuration information being absent in the second configuration message and, (ii) based on the first DCI not being detected in the monitoring occasion, the UE does not wake-up, and
wherein, (i) based on the second configuration information informing the UE to wake-up if the first DCI is not detected and, (ii) based on the first DCI not being detected in the monitoring occasion, the UE monitors a second PDCCH for detecting second DCI other than the first DCI in a next discontinuous reception (DRX) on duration.

2. The method of claim 1, wherein the first configuration information informs of at least one monitoring occasion.

3. The method of claim 1, wherein the operation to be applied to the UE is that the UE wakes up.

4. A user equipment (UE) comprising:
at least one memory storing instructions;
at least one transceiver for transmitting and receiving a radio signal; and
at least one processor connected to the at least one transceiver and the at least one memory and configured to execute the instructions to perform operations comprising:
receiving, from a base station, a first configuration message comprising first configuration information for a monitoring occasion for detecting first downlink control information (DCI) including information for whether the UE to wake-up;
receiving, from the base station, a second configuration message which can comprise second configuration information for an operation to be applied to the UE based on the first DCI not being detected; and
monitoring a first physical downlink control channel (PDCCH) for detecting the first DCI in the monitoring occasion,
wherein, (i) based on the second configuration information being absent in the second configuration message and, (ii) based on the first DCI not being detected in the monitoring occasion, the UE does not wake-up, and
wherein, (i) based on the second configuration information informing the UE to wake-up if the first DCI is not detected and, (ii) based on the first DCI not being detected in the monitoring occasion, the UE monitors a second PDCCH for detecting second DCI other than the first DCI in a next discontinuous reception (DRX) on duration.

5. The UE of claim 4, wherein the first configuration information informs of at least one monitoring occasion.

6. The UE of claim 4, wherein the operation to be applied to the UE is that the UE wakes up.

7. A base station (BS) comprising:
at least one memory storing instructions;
at least one transceiver for transmitting and receiving a radio signal; and
at least one processor connected to the at least one transceiver and the at least one memory and configured to execute the instructions to perform operations comprising:
transmitting, to a user equipment (UE), a first configuration message comprising first configuration information for a monitoring occasion for detecting first downlink control information (DCI) including information for whether the UE to wake-up; and
transmitting, to the UE, a second configuration message which can comprise second configuration information for an operation to be applied to the UE based on the first DCI not being detected in the monitoring occasion,
wherein the BS does not transmit second DCI other than the first DCI in a next discontinuous reception (DRX) on duration after the monitoring occasion (i) based on the second configuration information being absent in the second configuration message and (ii) based on the first DCI not being transmitted in the monitoring occasion, and
wherein the BS transmits the second DCI other than the first DCI in the next DRX on duration after the monitoring occasion based on the second configuration information informing the UE to wake-up if the first DCI is not detected.

* * * * *